US008287998B2

(12) United States Patent
Skelhorn

(10) Patent No.: US 8,287,998 B2
(45) Date of Patent: Oct. 16, 2012

(54) COMPOSITION OF A THERMALY INSULATING COATING SYSTEM

(76) Inventor: Anthony David Skelhorn, Peoria, AZ (US)

( * ) Notice: Subject to any disclaimer, the term of this patent is extended or adjusted under 35 U.S.C. 154(b) by 434 days.

(21) Appl. No.: 10/989,120

(22) Filed: Nov. 15, 2004

(65) Prior Publication Data

US 2005/0126441 A1    Jun. 16, 2005

Related U.S. Application Data

(60) Provisional application No. 60/525,683, filed on Dec. 1, 2003.

(51) Int. Cl.
*B32B 5/16* (2006.01)
*B32B 18/00* (2006.01)

(52) U.S. Cl. .................. 428/323; 428/325; 428/327

(58) Field of Classification Search ............... None
See application file for complete search history.

(56) References Cited

U.S. PATENT DOCUMENTS

| | | | | |
|---|---|---|---|---|
| 5,296,285 A | * | 3/1994 | Babel et al. | 428/213 |
| 5,650,461 A | * | 7/1997 | Wasserman et al. | 524/441 |
| 2003/0036585 A1 | * | 2/2003 | Purgett et al. | 523/172 |
| 2003/0215640 A1 | * | 11/2003 | Ackerman et al. | 428/405 |

* cited by examiner

*Primary Examiner* — Sheeba Ahmed
(74) *Attorney, Agent, or Firm* — Parsons & Goltry; Michael W. Goltry; Robert A. Parsons

(57) ABSTRACT

A composition for a Coating System (paint) which forms an insulating material being designed to both reflect infrared radiation and have reduced thermal conductivity. The coating system may be either a single Thermal Coating or may be a Thermal Coating used in combination with a Thermal Primer. The Thermal Coating is formulated using conventional techniques and a resin used in paint manufacture, but utilizes primary pigments and extender mineral pigments which preferentially reflect in the infra red area of the solar spectrum. A method of characterizing particulate materials for their infra red reflectivity is described, which provides a means for preferential selection of particulate additives based on their relative visible light and infrared reflectivity. Additionally the incorporation of hollow micro-spheres is desired to reduce thermal conductivity. The Thermal Primer is designed to provide adhesion between the Thermal Coating and the substrate on which it is applied and uses conventional techniques to achieve those properties. However it has been found advantageous to incorporate hollow micro-spheres with low thermal conductivity, such as glass, ceramic or polymeric microspheres and/or an extender pigment with low thermal conductivity such as calcined clay to further reduce heat flow through the Coating System.

14 Claims, 13 Drawing Sheets

Solar Spectrum Energy Distribution

Thermal Conductivity of different Paint Films at 30% PVC

Reflectance Spectra of Green Coatings

Figure 6
Outdoor Temperature Rise measurements
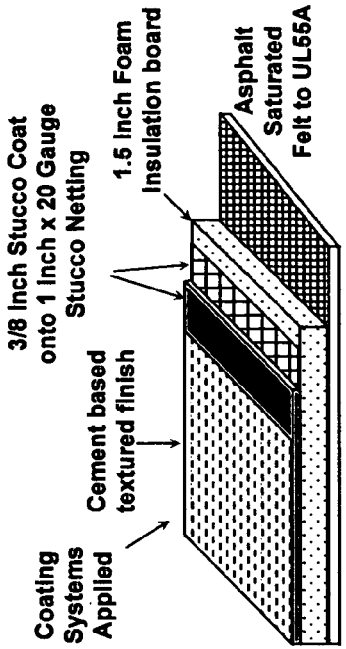
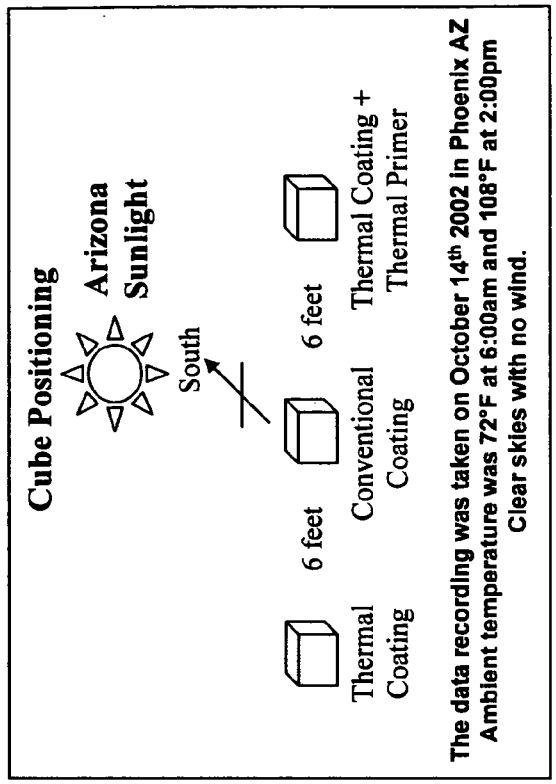
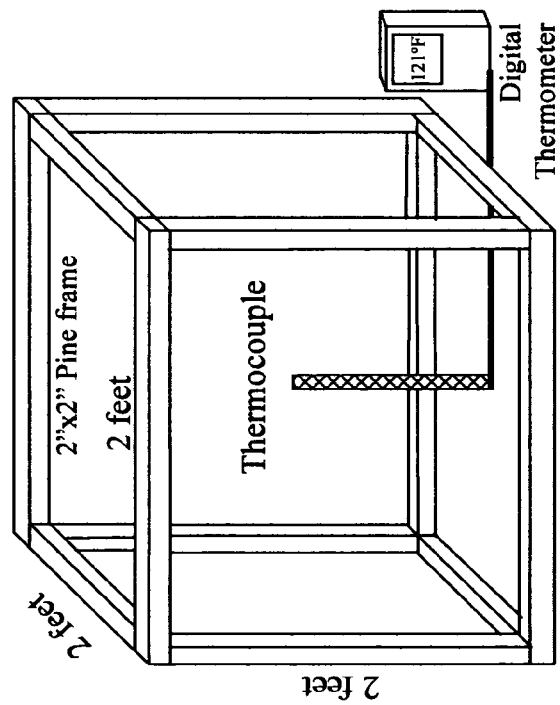
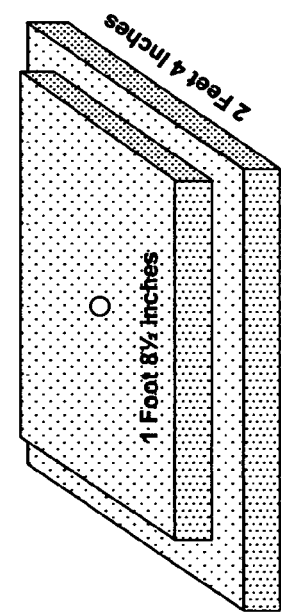

Thermal Conductivity of Coatings applied to Cubes

External Temperature of housings coated with BLACK Infrared reflective CARC and Thermal Coating CARC's Reflectance Spectra for BLACK CARC comparing Conventional Pigmenting with infrared reflective Pigmenting Thermal Conductivities of BLACK CARC's

COMPOSITION OF A THERMALY INSULATING COATING SYSTEM

STATEMENTS AND REFERENCES

Reference: Provisional application No. 60/525,683 filing date Dec. 1, 2003, Composition of a thermally insulating coating system, Anthony D. Skelhorn.

BACKGROUND OF INVENTION

Compositions that may be used to thermally insulate other materials, especially from the effect of intense sunlight, have a number of potential applications: Examples include among others:
a) Insulation of structures (e.g. a house or hotel) to reduce energy consumption, especially during summer months in southern regions.
b) Insulation of flooring material (such as wood or concrete) to reduce the temperature, thus allowing, for example, barefoot passage on a patio or deck.
c) Insulation of heat sensitive equipment such as is used in military and civilian applications, allowing improved operational efficiency by reducing the influence of heat on internal components under arduous conditions, such as desert environment.

The invention describes a method of preparing a paint system (paint or paint plus primer) which offers a solution to the problem of solar heating. Moreover the material may be applied by conventional methods, such as brush, spray or roller, and may be applied during original part preparation or retroactively after a product has been manufactured or placed in service.

Infra red reflecting compositions have been produced using a number of approaches. U.S. Pat. No. 5,006,175 describes a brown rutile pigment composition from about 40 to about 50% by weight of titanium, from about 2.3 to about 4.5% by weight of manganese, from about 7.3 to about 11% by weight of tungsten, from 0.05 to about 5% of lithium and from about 0.1 to about 20% of cerium. Use of the brown rutile pigment is described in rigid vinyl and alkyd paint and is described as infra red reflective between 700-1000 nm.

The patent describes Color values in masstone and tint were tested using a conventional laboratory paint shaker method, dispersing the pigments in an air-dry enamel vehicle, and grinding for 20 minutes on a paint shaker in a glass jar with glass beads. The tint was calculated as 50% pigment and 50% titanium dioxide. The dispersion was then drawn down on a Leneta opacity chart. Color differences were evaluated using the Diano Match-Scan Spectrophotometer and expressed in Hunter values. Tint strength differences were calculated using the K/S figure at 460 nanometers. The differences between the pigment of Example 1 and the pigment of Example A were found to be as follows:

TABLE II

|            | DE   | LD    | RG    | YB    |
|------------|------|-------|-------|-------|
| Masstone:  | 0.18 | −0.13 | −0.09 | −0.09 |
| Tint (1:1) | 0.27 | −0.26 | 0.01  | −0.07 |

The results with respect to masstone show insignificant differences between the two pigments. In tint, however, is found that the pigment of Example 1 has a 3% strength advantage over the pigment of Example A, and this is believed to be due to the finer particle size.

Nothing further is described for coating systems. The patent does describe use in PVC sidings as follows: one desirable characteristic of the pigments and other additives that are blended with the vinyl chloride is their ability to reflect infra red rays. A highly infra red reflective siding will remain cooler when exposed to sunlight than a siding containing additives which readily absorb many of these infra red rays. Lower temperatures mean a lower heat build-up within the structure and longer life for the siding. A reduction of a few degrees in the heat build-up translates into a substantial increase in the life of the siding. No further quantification of the infra red reflectivity effect is described or how to formulate to maximize the effect.

U.S. Pat. No. 5,607,995 describes a paint composition which comprises a binder to impart film forming properties compounded with quasi transparent polyolefin filler particles having a particle size below 110 micrometers, said polyolefin being selected from the group consisting of a polyethylene, a polypropylene, copolymers of ethylene and propylene and mixtures thereof, said polyolefin filler particles being present in an amount between 0.1% to 10% by weight of the composition. These paint compositions were found to possess low gloss and matte properties at visible and high reflectance in the thermal infra-red wavelengths.

U.S. Pat. No. 5,650,461 describes a paint compositions which provide a Chemical Agent Resistant Coating (CARC), consisting of one layer topcoat paint system, which imparts an increase in the reflectivity at the thermal infra-red region, while controlling the colour in the visible range and are maintaining a low gloss, comprising: an extender selected from polyolefins and substituted polyolefins; a pigment, selected from a metal oxide calcined at a temperature of above 600.degree. C. and a paste of metal flakes and any mixture thereof; a binder consisting of a modified polyurethane resulted from an isocyanate and a co-reactant possessing at least two hydroxy groups, and a solvent system to dissolve the components in the paint composition.

U.S. Pat. No. 5,713,974 describes Evacuated microspheres, insulating materials constructed from such microspheres, and methods of manufacturing same provide insulation and reduce heat transfer through radiation, conduction and convection. Additionally, an infrared reflective coating is provided on a microsphere surface to reduce radiant heat transfer. A protective exterior coating is also provided to protect an exteriorly applied infrared reflective coating on such a microsphere. Furthermore, the spheroidal geometry of such micro-spheres restricts heat transfer to point-to-point conduction there between. Finally, evacuated micro-spheres further reduce through-heat transfer within a shell. One embodiment utilizes such evacuated micro-spheres in constructing an elastomeric roof coating which appreciably reduces cooling and air conditioning power costs for a building. An alternative embodiment utilizes such an elastomeric coating in constructing an exterior paint for a building. A method of evacuating such micro-spheres involves in-permeation of selected gases within a microsphere that reacts under sufficiently high temperatures with residual gases within the microsphere to produce by-product gases which out-permeate from within the sphere under sufficiently high temperatures. Furthermore, a method of constructing suitable glass microspheres which are suitable for evacuating via out-permeation is also described.

The patent focuses on the method of production of the evacuated micro-spheres and describes their use in an exterior coating formulation as follows: "The evacuated shells 12 provide a crucial component in formulating a coating 32 which allows attainment of appreciably decreased thermal conductivity, and helps develop and retain a high reflectivity to solar and other infra-red radiation. A combination of long-term high IR reflectivity and low thermal conductivity decreases the energy loading, resulting from absorption and transference of heat, into a coated enclosure. For example, such a coating 32 could be utilized within an infra-red oven to retain heat more efficiently therein and enhancing the cooking operation of process."

The patent itself teaches nothing about specific wavelength effects, nor does it teach how to maximize IR reflectance of a coating or other composite material by formulating with other materials to gain an increased effect.

U.S. Pat. Nos. 6,174,360 B1 and 6,454,848 B2 describe new solid solutions having a corundum-hematite crystalline structure which are useful as inorganic pigments. Solid solutions according to the present invention include a host component having a corundum-hematite crystalline structure which contains as guest components one or more elements from the group consisting of aluminum, antimony, bismuth, boron, chrome, cobalt, gallium, indium, iron, lanthanum, lithium, magnesium, manganese, molybdenum, neodymium, nickel, niobium, silicon, tin, titanium, vanadium, and zinc. Solid solutions according to the present invention are formed by thoroughly mixing compounds, usually metal oxides or precursors thereof, which contain the host and guest components and then calcining the compounds to form the solid solutions having corundum-hematite crystalline structure. Some of the new solid solutions according to the present invention exhibit relatively low Y CIE tri-stimulus values and relatively high near infrared reflectance. The patent suggests these solid solution pigments may be suitable as pigments in the general paint and polymer markets where increased near infrared reflectance would result in low heat build-up and thus lower energy costs.

SUMMARY OF INVENTION

The purpose of the present invention is to provide a composition description that allows a "Coating System" comprised of either one or two layers, being a "Thermal Coating" and, optionally, a "Thermal Primer". The Coating System is designed with high infra red reflectivity plus reduced thermal conductivity, and may be formulated to any desirable color. This approach is especially beneficial if darker colored coatings are desired, since these are often considered to be most heat absorbing. The Coating System is designed to reduce heat transfer from the environment to the substrate that is protected by the Coating System by formulating to reduce both radiant and conductive heating. The Coating System provides a mechanism for reducing absorption of electromagnetic radiation in the infra red region of the spectrum, commonly described as heat, plus use of materials which reduce conductive heat transfer. The system is designed to act as an insulating material in applications where infra red radiation levels are significant, such as bright sunlight.

This Thermal Coating can be pigmented to produce conventional colors, and is especially valuable for darker colored coatings, and which may be smooth or textured, flat or glossy, according to normal definitions used within the coatings industry.

A Thermal Primer is essential for some applications where it is required to provide good adhesion between the substrate under consideration and the Thermal Coating top coat. If a primer is required, then it is desirable to incorporate thermally insulating materials, such as are specified in the "Thermal Coating" in order to further reduce conductive heat transfer.

The Coating System has been designed in such a way that it may be used in combination with a broad range of binder materials, for instance water based polymers such as acrylic homopolymers or copolymers or other conventional latex based or water soluble binders, or solvent based systems such as alkyd polymers, silicone, urethane 1-part or 2-part systems or other solvent based binder, even in Thermoset polymers and copolymers, such as unsaturated polyesters or epoxy systems. The coatings may be produced by brush, spray or electrostatic technique, or by molding, or may be applied to thermoplastic systems such as PVC, Polypropylene, Polyethylene, thermoplastic epoxy compound, thermoplastic polyester or other thermoplastic polymers which may be used to fabricate systems such as powder coatings, extruded profiles, or molded products using thermoplastic processing techniques, or may use a cold setting technique, or may be cement or gypsum-based.

BRIEF DESCRIPTION OF DRAWINGS

FIG. 6 shows the construction of three, two foot cubes which were constructed to measure both surface and internal temperatures after coating their exterior with three different coatings of the same color specification, defined by their CIE L*, a*, b* values.

DETAILED DESCRIPTION OF THE INVENTION

Figure 1:
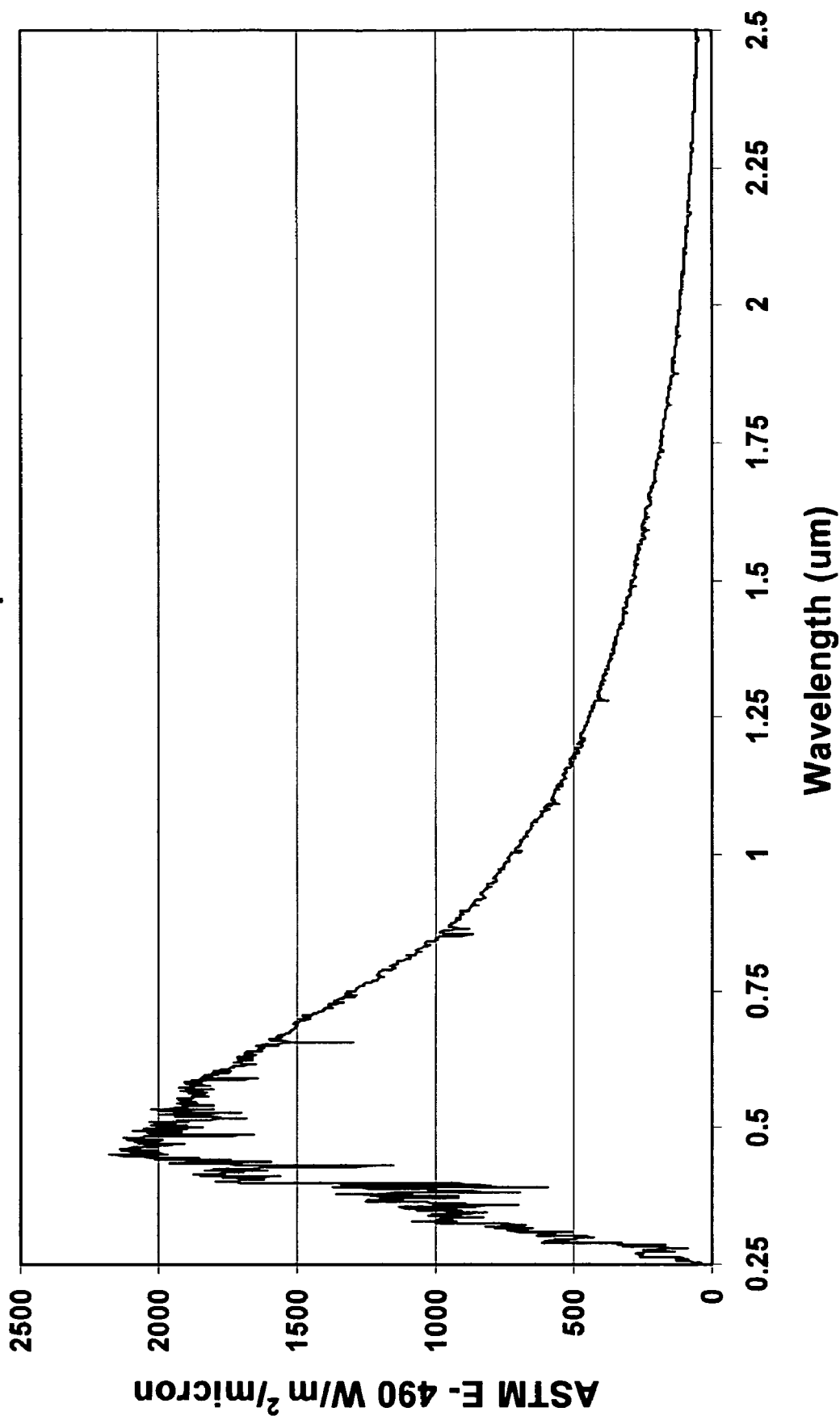
FIG. 1 shows the Solar Spectrum at sea level given in ASTM E490

The present invention is directed to the preparation of a Coating System, using a combination of materials described below used as a pigment and/or extender pigment (filler)

system to produce an infrared reflective effect in conjunction with a low thermal conductivity in a filled composite. This is designed for, but not limited to, a Coating System, which may be applied to a variety of material substrates, used either alone as a Thermal Coating, or in combination with a Thermal Primer, as required.

Formulation principles are conventional, except for the focus on the use of materials which have been found to have a high infra red reflectivity and/or low thermal conductivity. These materials, when used in combination of at least any two material classes and preferably a combination of all three material classes will result in a Thermal Coating, characterized by a high infra red reflectivity PLUS a low thermal conductivity signature. In some instances, it may be necessary to utilize a primer layer, a Thermal Primer, as a part of the system in order to provide the level of adhesion needed to insure compatibility between the substrate and the Thermal Coating. It has been found that, in the event that a primer coating is required, that the incorporation of hollow micro-sphere filler and/or other low conductivity extender pigments into the primer system is an effective alternative or complement to use in the Thermal Coating to reduce the thermal conductivity of the system.

The composite material, in the form of a Coating System (paint), may be based on any polymer-based material, may be water based or solvent-based, single component or multi-component paint or polymer system, or on cement or gypsum based system. This is because the thermal characteristics have been found to be a function of the reflectivity and/or thermal conductivity of the components and not the polymeric, cement-based or gypsum-based binder systems. The use of the materials described allows for a wide range of materials to be prepared, which in turn allows the system to be formulated for a broad range of applications. Typical applications include, but are not exclusive to: Coatings for the exterior of constructions (houses, offices, hotels, etc.), Coating for concrete, wood, plastics or other materials used for walkways, such as patios, pools, decks, etc., Coating of vehicles used for transportation, coating of products for military applications which are sensitive to heat effects due to, e.g. infra red radiation, coatings for optical systems such as cameras, scopes or thermal imaging systems, and many other uses.

The coating materials may be formulated using the described materials under a wide range of loadings. Most applications will require use at a level below Critical Pigment Volume Concentration (cPVC), especially if the use is to be for outdoors or for protective use. On the other hand, materials may also be formulated at levels known to be near or above cPVC if the application allows for high loadings to be accommodated by the formulation.

The Coating System comprises either one or two layers of coating material applied to a substrate, or may be defined also as the exterior surface of a material if the infra red reflective components are incorporated into a product which is fabricated other than by application of a coating.

The Thermal Coating layer contains two or more materials from the following groups of materials:
1) Extender pigments having a high reflectivity in the infra red region of the electromagnetic spectrum relative to the visible region (i.e. has an Infra Red Reflectivity Index greater than 1.0 see example below),
2) Hollow micro-spheres made of glass, ceramic material or organic polymer
3) Infra-red reflective primary pigmenting materials.

The Thermal Primer, where required, should be designed to meet the requirements for good adhesion between the substrate and the Thermal Coating using conventional formulating techniques. It has been found to be advantageous to include a hollow micro-sphere based on glass, ceramic or polymer; and/or extender pigment with low thermal conductivity characteristics which have been found to enhance the thermal properties of the coating System.

1) Extender pigments commonly used in the coatings and other industries all have different reflectance characteristics described by their solar reflectance spectra. This is particularly important to consider the infra red region of the solar spectrum if materials are to be used to reflect in these wavelengths. These materials are usually considered for use based on their visible reflectance behavior and are selected because of their contribution to visible color, white, red, green, blue etc. However, their contribution to infrared reflectance is often not considered. It has been found that several materials have infra red reflectance spectra which show advantageous properties when composition design is for reflectivity in the infra red region.

Examples of extender pigments are calcium carbonate (both naturally ground and precipitated), crystalline and amorphous silicas (both natural and synthesized), silicate minerals (such as Talc, kaolin, calcined clay, wollastonite, nepheline syenite, feldspars, micas, attapulgite clay, bentonites and organically modified bentonites), alumina trihydrate, aluminum oxides, barytes, lithopone and others.

The solar reflectance spectra of many of these materials have been measured in coating systems and it has been determined that some of these extender pigments exhibit proportionately higher reflectivity in the infrared region than others. A method of characterizing materials was used to identify materials that have a higher infrared reflectivity than is found in the solar spectrum (Table 1). The method evaluates the reflectivity across the solar spectrum between 250 nm and 2500 nm wavelengths FIG. 1 shows the solar spectrum as given in ASTM E490, which shows solar energy versus wavelength at sea level.

Figure 2:
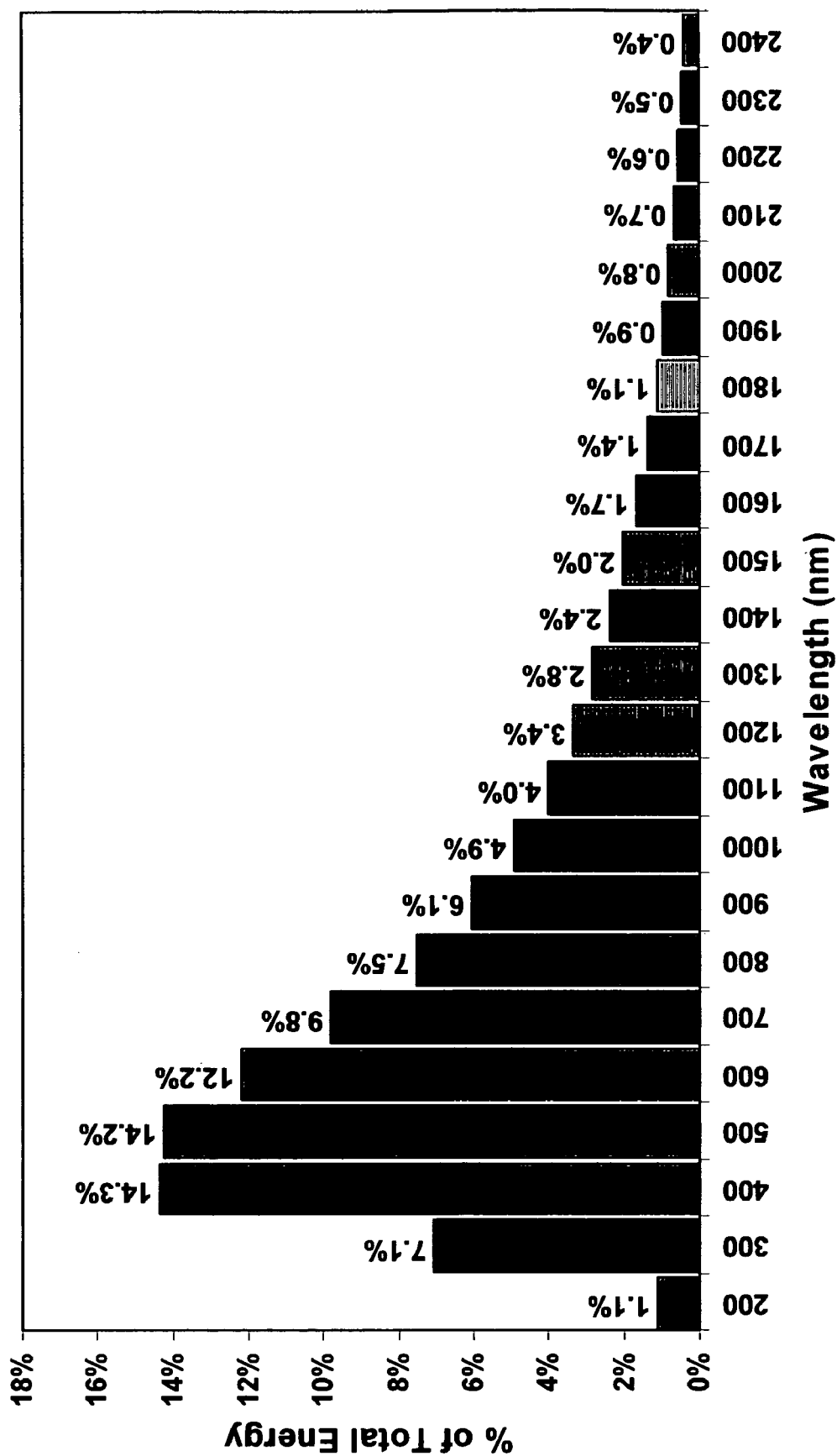
FIG. 2 shows an alternative method of representing the ASTM E490 solar spectrum in terms of the % energy by wavelength band.

This can be represented by calculating the energy in specific wavelength bands, e.g. of 100 nm, as shown in FIG. 2.

The energy reflected is determined by calculating the product of the percentage of solar energy spectrum and % reflectance of a coating, in wavelength bands of 100 nm. The percent reflectance in both UV-visible (250-799 nm) and infrared (800-2500 nm) can be calculated as a percent of the solar spectrum. The ratio of these two values (% Infrared reflectance:% UV-visible reflectance), when compared to the same ratio for the solar spectrum may be used to determine an Infrared Reflectivity Index which describes a materials relative reflectivity (Table 1). Values above 1.0 show a higher ratio of infrared reflectance than the solar spectrum (better infrared reflectors), and values below 1.0 show higher UV-visible light reflectance than the solar spectrum (poorer infrared reflectors).

TABLE 1

Determination of Infrared Reflectivity Index

| Example is for NeoGen FTE at 30% PVC | % Reflectance of Coating with NeoGen FTE A | Wavelength (nm) | % of Total Solar Spectrum B | % of Energy Reflected by NeoGen FTE coating A × B |
|---|---|---|---|---|
| UV-Visibile Region | 7.25 | 250-299 | 1.131 | 0.08 |
| | 22.69 | 300-399 | 7.084 | 1.61 |
| | 70.85 | 400-499 | 14.341 | 10.16 |
| | 83.45 | 500-599 | 14.235 | 11.88 |
| | 86.64 | 600-699 | 12.193 | 10.56 |
| | 89.32 | 700-799 | 9.830 | 8.78 |

TABLE 1-continued

Determination of Infrared Reflectivity Index

| Example is for NeoGen FTE at 30% PVC | % Reflectance of Coating with NeoGen FTE A | Wavelength (nm) | % of Total Solar Spectrum B | % of Energy Reflected by NeoGen FTE coating A × B |
|---|---|---|---|---|
| Infrared Region | 90.92 | 800-899 | 7.547 | 6.86 |
| | 90.42 | 900-999 | 6.054 | 5.47 |
| | 90.33 | 1000-1099 | 4.926 | 4.45 |
| | 87.49 | 1100-1199 | 4.007 | 3.51 |
| | 86.37 | 1200-1299 | 3.354 | 2.90 |
| | 85.85 | 1300-1399 | 2.825 | 2.43 |
| | 75.35 | 1400-1499 | 2.368 | 1.78 |
| | 76.00 | 1500-1599 | 2.009 | 1.53 |
| | 70.47 | 1600-1699 | 1.695 | 1.19 |
| | 59.58 | 1700-1799 | 1.393 | 0.83 |
| | 66.16 | 1800-1899 | 1.134 | 0.75 |
| | 60.20 | 1900-1999 | 0.946 | 0.57 |
| | 61.64 | 2000-2099 | 0.799 | 0.49 |
| | 52.85 | 2100-2199 | 0.671 | 0.35 |
| | 44.40 | 2200-2299 | 0.569 | 0.25 |
| | 30.03 | 2300-2399 | 0.480 | 0.14 |
| | 29.71 | 2400-2500 | 0.410 | 0.12 |
| % Infrared Energy (C) | | 800-2500 | 41.19 | 33.63 |
| % UV-Vis Energy (D) | | 250-799 | 58.81 | 43.07 |
| Total Energy Reflected (C + D) | | 250-2500 | 100.00 | 76.7 (E) |
| Ratio IR to UV-Vis (C/D) | | | 0.70 (F) | 0.78 (G) |
| Infrared Reflectivity Index (G/F) | | | | 1.12 |

This approach was used to characterize a wide range of materials to determine their Infrared Reflectivity Indices (See example 1).

2) Hollow micro-spheres of various compositions have been found to have particularly useful role in reducing thermal conductivity of the coating, thus reducing the heat flow through the Coating System. Examples of hollow micro-spheres include glass micro-spheres of different glass compositions, being hollow and having different diameter to wall thickness values and different particle diameters (e.g. 3M Scotchlite micro-spheres). Other examples include ceramic micro-spheres (e.g. 3M's Z-light Spheres, Cenospheres, fly ash), or micro-spheres based on organic polymer composites, such as polymers or copolymers of acrylic materials that may be in dry powder or dispersed in an aqueous carrier (e.g. Rhopaque by Rohm and Haas), or based on copolymers of vinylidene chloride and acrylonitrile (e.g. Expancel by Expancel, Inc.). Table 2 shows literature values for thermal conductivity for a number of materials, sequenced by thermal conductivity value. It is desirable to use materials with thermal conductivity values below 0.3 W·m$^{-1}$·K$^{-1}$, and preferably below 0.2 W·m$^{-1}$·K$^{-1}$ and most preferably below 0.1 W·m$^{-1}$·K$^{-1}$.

TABLE 2

Thermal Conductivities for a range of materials from Literature.

| Material | Thermal Conductivity (W·m$^{-1}$·K$^{-1}$) |
|---|---|
| Air | 0.025 |
| Expanded Polystyrene | 0.025 |
| Foamed Glass | 0.045 |
| Cenospheres | 0.05-0.22 |
| Scotchlite glass bubbles | 0.06-0.26 |
| Glass microspheres | 0.09 |
| Polypropylene homopolymer | 0.12 |
| Glass pearls | 0.18 |
| Acrylic polymers | 0.19-0.25 |
| Epoxy polymers | 0.2 |
| Polyurethane polymers | 0.2 |
| Z-light spheres | 0.2 |
| Nylon | 0.22 |
| Polytetrafuoroethylene (PTFE) | 0.25 |
| EVA | 0.34 |
| Wood | 0.4 |
| Bentonite clay | 0.4-0.5 |
| Diatomaceous Earth | 0.5 |
| Alkyd Resin | 0.6 |
| Borosilicate Glass | 0.88-1.1 |
| Glass | 0.93 |
| Concrete | 1.0-1.28 |
| Pyrex | 1.03 |
| Silica Glass | 1.38 |
| Fused Silica | 1.4-2.0 |
| Soda-Lime solid glass spheres | 1.51 |
| Kaolin | 1.97 |
| Calcined Clay | 1.97 |
| Zeeospheres | 2.0-2.3 |
| Talc | 2.0-25.0 |
| Dolomite | 2.9-3.3 |
| Quartz | 3.0-6.7 |
| Marble | 3.0 |
| Rutile | 7.4-10.4 |
| Zinc Oxide | 23 |
| Magnesium Oxide | 36 |

It has been found that materials should have a mean particle size of preferably between 0.5 and 300 microns, more preferably between 5 and 200 microns and most preferably between 10 and 150 microns, measured by microscopy. These products may have a broad or narrow particle size distribution and may have unimodal or polymodal particle size distributions.

3) Infra red reflective pigments of various compositions, typically being solid solutions having corundum-hematite crystalline structure containing guest component metal oxides described in U.S. Pat. Nos. 6,174,360 B1 and 6,454,848 B2, which are designed to have high reflectivity in the infrared region of the spectrum. These are typically complex calcined metal oxide compositions and are marketed specifically for their infrared reflective qualities. A range of products under the GEODE, "Cool Colors" and "Eclipse" brands by Ferro Pigments have been found to be particularly advantageous. The range of reflective pigments available allows for a complete color range to be developed, by mixing different pigments according to normal color formulating practices. These infrared reflective pigments may be complemented by use of conventional pigment systems which do not exhibit high infra red reflectivity if necessary to achieve specific visible (color) effects.

Products available under this category include: V-778 IR Brown-Black, V-780 IR Brown-Black, V-797 IR Black, V-799 Black, F-5686 Turquoise, PC-9158 Autumn Gold, PC-9416 Yellow, V-9250 Bright Blue, V-9248 Blue, V-9415 Yellow, 10201 Eclipse Black, 10202 Eclipse Black, 10203 Eclipse Blue Black, 10241 Forest Green, 10411 Golden Yellow, 10415 Golden Yellow, 10364 Brown, O-1775B Black, V-12112 Bright Golden Yellow, V-12600 Cobalt Green, V-12650 IR Green, V-13810 Red.

4) Where a Thermal Primer is required to develop adhesion between the substrate and outer coating, it has been found to be advantageous to incorporate hollow micro-spheres to reduce the thermal conductivity, thus complementing the insulation value of the Thermal Coating, and/or the use of an extender pigment with low thermal conductivity properties.

Materials described in section 2, above form the basis of choice. Materials which have been found to be particularly useful include Scotchlite glass bubbles (3M Company), Z-light Spheres (3M Company), Cenospheres (Ashtek Corporation), or other similar materials. Particle size and size distribution will be selected according to the need of the final application, but is preferably from 0.5 to 500 microns, or more preferably from 2 to 200 microns or most preferably from 5 to 50 microns average particle size, measured by microscopy.

Embodiments of the present invention will now be described by way of example only with reference to the following examples in which conventional coatings are included for purposes of comparison with the Coating System(s) of the invention.

EXAMPLE 1

A number of extender pigment materials were used to prepare single pigment paints at a Pigment Volume Concentration of 30% (Table 3).

TABLE 3

30% PVC Single Pigment Formulation for measurement of Thermal Properties

| Material | Weight (g) | % Solids | Dry Volume |
|---|---|---|---|
| M-444 Acrylic Resin | 140 | 50 | 70 |
| Defoamer BYK-018 | 0.2 | 50 | |
| Superwet S22 surfactant | 0.2 | 50 | |
| Busperse 39 dispersant | 1.8 | 50 | |
| Pigment | 30 × SG | 100 | 30 |

Mix under high shear using a Dispermat mixer at 5000 rpm until dispersed

| Manufacturer | Pigment | Specific Gravity | Pigment wt per 140 resin |
|---|---|---|---|
| US Silica | Silcosil 125 | 2.65 | 79.5 |
| Ineos | MD101 Fume Silica | 2.40 | 72.0 |
| Omya | Omyacarb 10 | 2.68 | 80.4 |
| Specialty Minerals | Marblewhite #325 | 2.65 | 79.5 |
| Mississippi Lime | Magnum Gloss PCC | 2.85 | 85.5 |
| Imerys | Glomax JDF | 2.62 | 78.6 |
| Engelhard | Satintone W | 2.62 | 78.6 |
| Imerys | MetaStar | 2.62 | 78.6 |
| Imerys | NeoGen 2000 | 2.62 | 78.6 |
| Imerys | NeoGen FTE | 2.62 | 78.6 |
| Buckman Labs | Busan 11-M 1 | 3.30 | 99.0 |
| Sachtleben Chemie | Blanc Fixe Micro | 4.36 | 130.8 |
| Sachtleben Chemie | Lithopone DS | 4.30 | 129.0 |
| Kadox | Kadox 915 | 5.60 | 168.0 |
| Halox | Strontium Zinc Phosphosilicate | 3.24 | 97.2 |
| Luzenac | Nicron 554 Talc | 2.85 | 85.5 |
| Dicalite Corp | Dicalite WB-5 | 2.40 | 72.0 |
| Oxides Inc. | Antimony Trioxide | 4.40 | 132.0 |
| 3M | Z-light ceramic spheres G3150 | 0.70 | 21.0 |
| 3M | Scotchlight K-20 | 0.25 | 7.5 |
| Akzo | Expancel WB551WE | 0.037 | 2.2 |
| Engelhard | Alzibronze 39 Mica | 2.73 | 81.9 |
| Rhom & Haas | Rhopaque | 1.05 | 31.5 |
| E.I. DuPont | Rutile | 4.20 | 126.0 |
| Kronos | Anatase | 3.80 | 114.0 |
| Specialty Polymers | M-444 resin (control) | na | 0 |

Measurement in a paint medium was done to eliminate the influence of entrapped air that is found when evaluating the extender pigment powders. This entrapped air plays a significant role in scattering of electromagnetic radiation, whether in the visible region or infra red region of the electromagnetic spectrum and is known to interfere with determination of the spectral response of the mineral alone. These materials were dispersed using a Dispermat LC fitted with a 2 inch high speed disperser blade at 7500 rpm for 5 minutes. The paint samples were used to prepare a paint draw-down on Leneta drawdown card, type 5DX, using an 8-path precision wet film applicator at 3 mils (75 microns) application thickness. The coatings were allowed to dry for 1 week after which reflectance values were determined for wavelengths from 250 nm to 2500 nm at 10 nm intervals, using the black background area of the Leneta card. The Infra Red Reflectivity Indices were calculated for each of these single-pigment paints following the example method in Table 1 above. Values obtained using this method area shown in Table 4.

TABLE 4

Infrared Reflectivity Indices for pigments in 30% PVC formulation

| Pigment | Description | Infrared Reflectivity Index |
|---|---|---|
| Hydrite PXH | Water washed kaolin | 0.60 |
| Rhopaque | Opaque polymer spheres | 0.90 |
| Anatase | Titanium dioxide | 0.95 |
| Busan 11-M1 | Barium metaborate | 0.98 |
| MD 101 | Fume silica | 0.98 |
| Solar Spectrum | | 1.00 |
| Blanc Fixe Micro | Barium sulphate | 1.00 |
| Scotchlite Spheres | Glass spheres | 1.01 |
| Magnum Gloss | Precipitated calcium carbonate | 1.02 |
| Resin only control | | 1.03 |
| Rutile | Titanium dioxide | 1.03 |
| Halox | Strontium zinc phosphosilicate | 1.04 |
| Marblewhite #325 | Calcium carbonate | 1.05 |
| Omyacarb 10 | Calcium carbonate | 1.06 |
| Dicalite WB-5 | Calcined diatomaceous earth | 1.06 |
| Lithopone DS | Lithopone | 1.07 |
| Antimony Trioxide | Antimony trioxide | 1.08 |
| Silcosil 125 | Silica flour | 1.09 |
| Expancel WB551WE | Polymer microspheres | 1.09 |
| NeoGen 2000 | Calcined clay | 1.11 |
| NeoGen FTE | Calcined clay | 1.12 |
| Satintone W | Calcined clay | 1.12 |
| Glomax JDF | Calcined clay | 1.14 |
| Nicron 554 | Talc | 1.23 |
| MetaStar | Calcined clay | 1.24 |
| Alsibronze 39 | Mica | 1.41 |

Extender minerals of the amorphous alumino-silicate, (also known as calcined clay, whether of the metakaolin or defect spinel form), Mica, Talc have particularly useful infra red reflectance spectra. For coatings formulations, these materials should have a mean particle size of preferably between 0.1 and 20 microns, more preferably between 0.3 and 10 microns and most preferably between 0.6 and 5 microns, measured by Sedigraph 5100 instrument (Micromeritics Company). These products may have a broad or narrow particle size distribution and may have unimodal or polymodal particle size distributions, or may have different levels of "structure" produced by chemical and/or thermal processes.

EXAMPLE 2

Single pigment coatings were prepared as described in Table 3. The paint samples were used to prepare a paint draw-down on siliconized release paper using an 8-path precision wet film applicator at 3, 6, 9 and 12 mils (75, 150 and 225 and 300 microns approximately) application thickness. The coatings were allowed to dry for 1 week. Film Thickness was measured using a "Mitutoyo Digimatic" micrometer.

Figure 4:
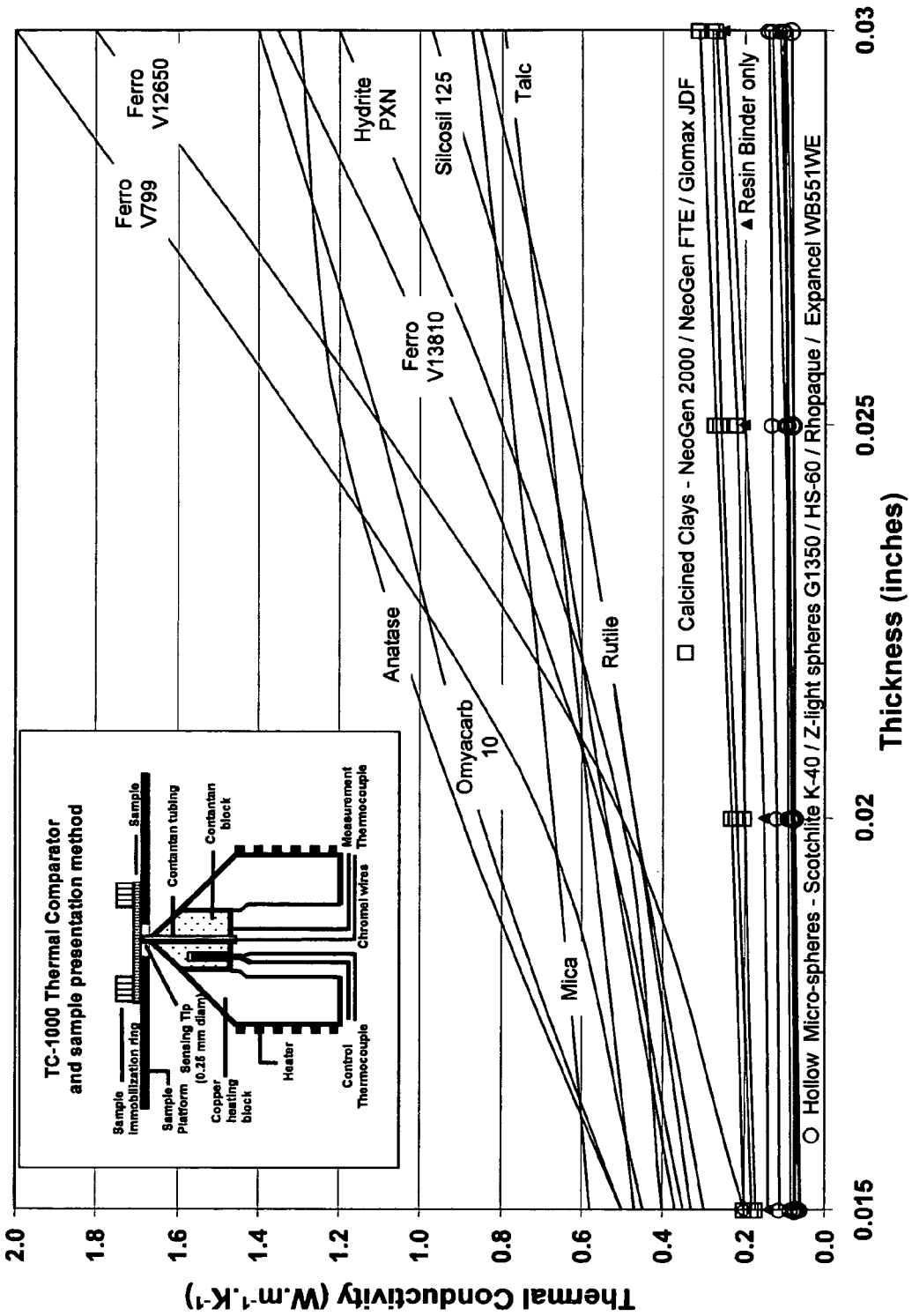
FIG. 4 shows Thermal Conductivity measurements of 30% PVC paint films of different thickness' using a TC-1000 Thermal Comparator with a modified sample immobilization ring (inset).

Thermal conductivity measurements were made using a T-C 1000 Thermal Comparator (Lafayette Instrument Company). The method uses an insulated mass that has fine temperature control using a controlled electrical heating element. For this study the mass was heated to 100+/−0.1 degrees Celsius while ambient temperature was 25 degrees Celsius. The mass has a conical tip (insert of FIG. 4) that contains a thermocouple for local temperature measurement, all of which is enclosed in an insulated chamber, through which only the tip protrudes. This tip is presented to the test media and reacts to the change in temperature that results upon contact. The magnitude of the temperature change can be directly related to the thermal conductivity of the material by preparation of a calibration curve using Standard materials with known thermal conductivities. Standards based on a) expanded Polystyrene (0.025 $W \cdot m^{-1} \cdot K^{-1}$), b) Polypropylene Homopolymer (0.12 $W \cdot m^{-1} \cdot K^{-1}$), c) PTFE (0.25 $W \cdot m^{-1} \cdot K^{-1}$) and d) Calcite single crystal (3.0 $W \cdot m^{-1} \cdot K^{-1}$) were used as references for these determinations.

Figure 3:
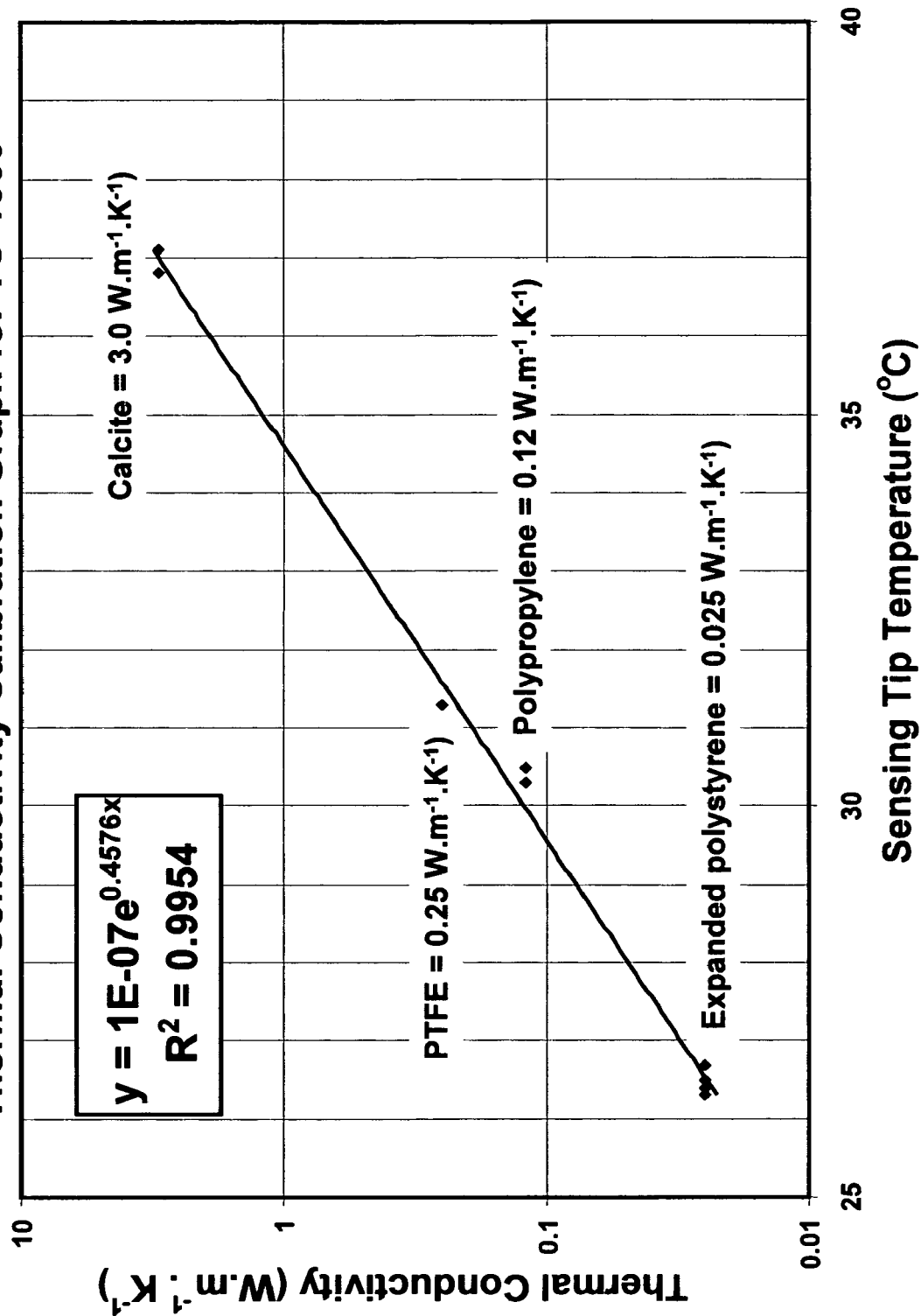
FIG. 3 shows a typical calibration chart for the TC-1000 Thermal Comparator using four relevant standard materials: Expanded Polystyrene, Polypropylene, PTFE and Calcite.

The standards were presented to the measuring tip and the immediate (i.e. less than 15 seconds) rise in temperature recorded for each material. The data was plotted on a Log-Linear scale for Thermal Conductivity (log scale) versus Temperature (linear scale) and the line of best fit determined. The formula for this line was used to determine the corresponding Thermal Conductivities for the Film samples for which temperature rise data were measured using the same procedure. The $R^2$ correlation coefficient for the calibration line thus produced were found to be excellent, typically 0.98 or higher. A typical plot is shown in FIG. 3.

It was found that the value obtained was influenced by the mass (or film thickness) of material being measured which is very limited for these thin films. It was found that the temperature rise (related to thermal conductivity) increased with film thickness. In order to obtain comparable values for apparent Thermal Conductivity, measurements were made on films cast against siliconized release paper at multiple film thicknesses. Thermal Conductivity was determined and plotted against film thickness, allowing interpolation of the data to obtain a value for any specific film thickness. Values were determined for apparent Thermal Conductivities at film thicknesses of approximately 0.015, 0.020, 0.025 and 0.030 inches respectively and are reported in Table 5 and FIG. 4. The film samples were removed from the siliconized release paper and temperature rise data determined by presenting these films to the tip of the TC-1000 comparator.

TABLE 5

Thermal Conductivity measurements on 30% PVC Paint films
Thermal Conductivities on 30% PVC Paint Flims ($W \cdot m^{-1} \cdot K^{-1}$)

| | Film Thickness: (inch) | | | |
|---|---|---|---|---|
| | 0.015 | 0.020 | 0.025 | 0.030 |
| Scotchlite K-40 | 0.070 | 0.075 | 0.080 | 0.085 |
| Expancel WB551WE | 0.065 | 0.075 | 0.080 | 0.100 |
| Scotchlite K-20 | 0.070 | 0.085 | 0.090 | 0.105 |
| HS-60 | 0.075 | 0.080 | 0.090 | 0.105 |
| Rhopaque | 0.060 | 0.075 | 0.100 | 0.130 |
| Z-light spheres G-3150 | 0.110 | 0.120 | 0.130 | 0.140 |
| Resin 444 only | 0.140 | 0.150 | 0.200 | 0.250 |
| Glomax JDF | 0.170 | 0.200 | 0.220 | 0.270 |
| NeoGen 2000 | 0.180 | 0.220 | 0.260 | 0.280 |
| NeoGen FTE | 0.200 | 0.230 | 0.270 | 0.310 |
| Nicron 554 Talc | 0.470 | 0.580 | 0.680 | 0.790 |
| Rutile TiO2 | 0.330 | 0.470 | 0.630 | 0.850 |
| AlSibronze 39 Mica | 0.580 | 0.670 | 0.770 | 0.870 |
| Silcosil 125 | 0.370 | 0.540 | 0.700 | 0.970 |
| Hydrite PXN | 0.400 | 0.500 | 0.800 | 1.200 |
| Anatase TiO2 | 0.500 | 0.900 | 1.200 | 1.300 |
| Ferro V13810 | 0.350 | 0.550 | 0.900 | 1.375 |

TABLE 5-continued

Thermal Conductivity measurements on 30% PVC Paint films
Thermal Conductivities on 30% PVC Paint Flims ($W \cdot m^{-1} \cdot K^{-1}$)

| | Film Thickness: (inch) | | | |
|---|---|---|---|---|
| | 0.015 | 0.020 | 0.025 | 0.030 |
| Zrconia | 0.500 | 0.850 | 1.100 | 1.400 |
| Omyacarb 10 | 0.500 | 0.850 | 1.100 | 1.400 |
| Ferro V12650 | 0.200 | 0.500 | 1.100 | 1.800 |
| Ferro V799 | 0.450 | 0.700 | 1.300 | 2.000 |

The data clearly shows significant differences in thermal conductivity of the film samples. The base resin values (0.25 $W \cdot m^{-1} \cdot K^{-1}$ at 0.03 inches) are reduced by the incorporation of various micro-spheres, whether composed of polymer, ceramic or glass (to 0.085-0.14 $W \cdot m^{-1} \cdot K^{-1}$ at 0.03 inches). The family of products described as calcined clays give particularly low values (0.27-0.31 $W \cdot m^{-1} \cdot K^{-1}$ at 0.03 inches), being similar in magnitude to the resin itself and much lower than indicated from literature, while materials more usually used as extenders, opacifiers and pigments were found to have significantly higher values (>0.8 $W \cdot m^{-1} \cdot K^{-1}$ at 0.03 inches).

EXAMPLE 3

Two "Thermal Coatings" were prepared and color matched to a typical industrial standard for the same application. The two "Thermal Coatings" were based on 1) a reflective pigment system and, 2) a reflective pigment plus an extender pigment having an "infra red reflectivity ratio" greater than 1.0 (NeoGen FTE—Table 6).

Figure 5:
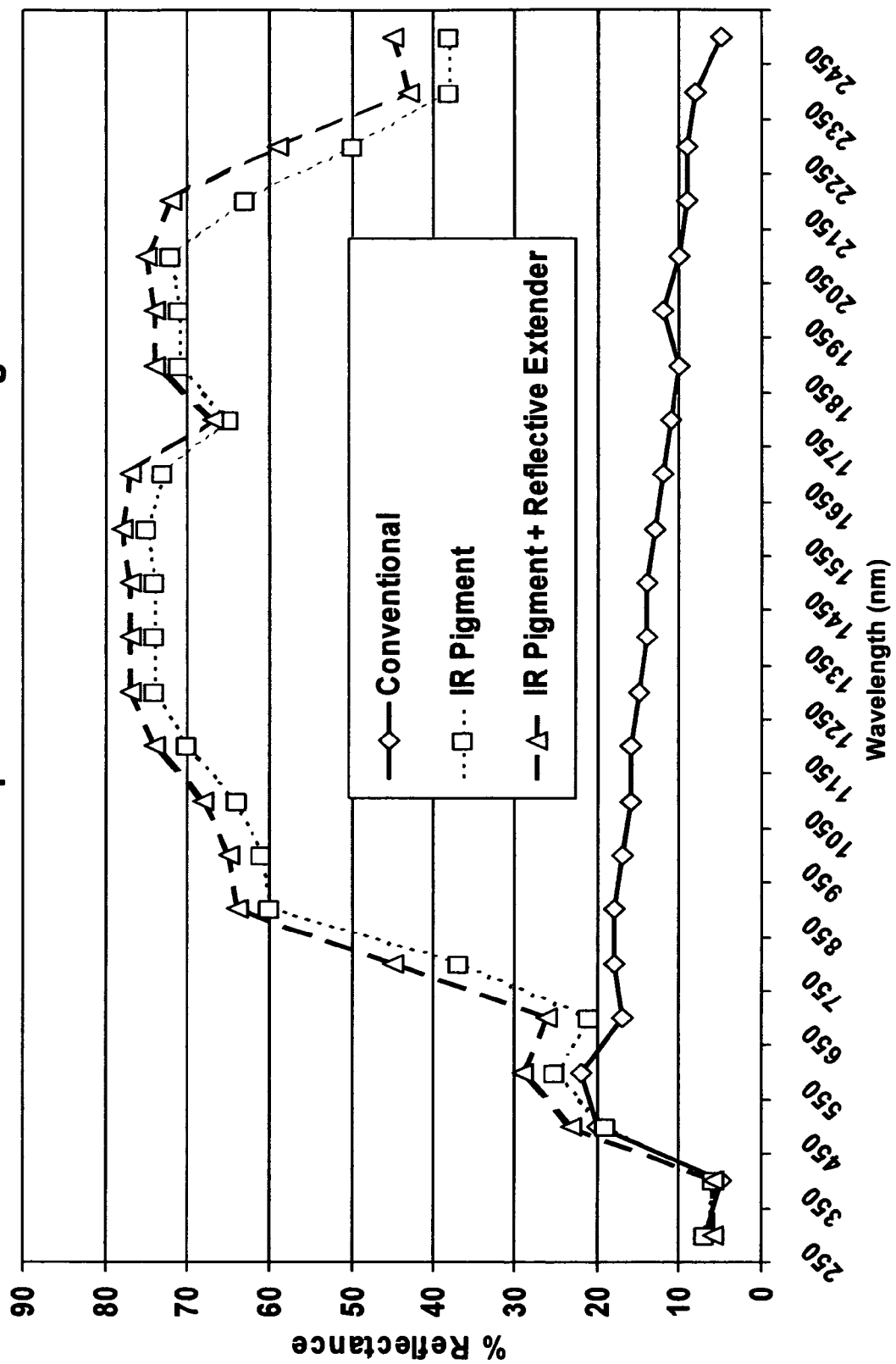
FIG. 5 shows the reflectance spectra for three coatings; two green Thermal coatings based on reflective pigments and reflective pigment plus reflective extender pigment.

The paint samples were used to prepare paint draw-downs on Leneta drawdown cards, type 5DX, using an 8-path precision wet film applicator at 3 mils (75 microns) application thickness. The coatings were allowed to dry for 1 week after which reflectance values were determined for wavelengths from 250 nm to 2500 nm at 10 nm intervals, using the black background area of the Leneta card. The reflectance spectra from 250 nm to 2500 nm are shown in FIG. 5 for these two coatings compared to the conventional material of the same color. These spectra demonstrate the complementary role of reflective extender pigment on reflectivity in the infra red region of the solar spectrum.

TABLE 6

Formulations which demonstrate
the use of Infrared reflecting extender pigment

| Tint Base: Description | 1) IR reflecting Pigment Weight % | 2) IR reflecting Pigment with high Infrared Reflectivity Ratio pigment Weight % |
|---|---|---|
| Water | 27.85 | 27.85 |
| KTTP powder | 0.05 | 0.05 |
| Texanol | 2.50 | 2.50 |
| BYK-018 | 0.30 | 0.30 |
| Bermocol CST 349 | 0.30 | 0.30 |
| AMP-95 | 0.05 | 0.05 |
| Busperse 39 | 0.50 | 0.50 |
| CR-50-2 TiO$_2$ | 8.00 | 8.00 |
| NeoGen FTE | — | 10.00 |
| Omyacarb 10 | 19.00 | 9.00 |
| Busan 1024 | 0.05 | 0.05 |
| Polyphase 600 | 0.10 | 0.10 |
| IC-2950 | 10.00 | 10.00 |
| M-444S emulsion | 27.50 | 27.50 |
| K-20 Glass bubbles | 2.50 | 2.50 |
| 22-S Superwet | 0.15 | 0.15 |

TABLE 6-continued

Formulations which demonstrate the use of Infrared reflecting extender pigment

| Tint Base: Description | 1) IR reflecting Pigment Weight % | 2) IR reflecting Pigment with high Infrared Reflectivity Ratio pigment Weight % |
|---|---|---|
| ASE-60 | 1.00 | 1.00 |
| PUR 2110 | 0.15 | 0.15 |
| Total: | 100.00 | 100.00 |
| Make-Down: (Green) | | |
| Tint Base | 100 | 100 |
| IR Black | 0.60 | 0.60 |
| IR Brown | 7.32 | 7.32 |
| IR Green | 0.26 | 0.26 |
| IR Autumn Gold | 2.46 | 2.46 |
| IR Red | 0.2 | 0.2 |

EXAMPLE 4

Three cubes were constructed according to the description in FIG. 6. The cubes were covered on five sides by a 1-Coat Stucco construction to ICBO ER-4658, this being a conventional exterior stucco insulation construction for dwellings. The base of the cube was plugged with a polystyrene foam plug and sealed to insure no significant movement of air into or out of the cubes. A thermocouple was suspended in the center point of each cube for the purpose of measuring internal temperature. Each cube was then painted with one of the three paint systems as follows:
1) A conventional exterior coating, known to be typical of a high quality product, used for this purpose.
2) A single coating comprised of a Thermal Coating (Table 7) applied at the same thickness.
3) A two-component coating system comprised of a Thermal Primer (Table 8) layer, which was then covered by the same Thermal Coating, used in II) above, applied at the same thickness.

All three systems were the same visual color, as determined by both eye and spectroscopy, having CIELab color co-ordinates as follows, and with a ΔE value well below the value of 0.5, which is generally accepted as a minimum value for which a trained eye can detect a color difference:
Conventional Coating: L*=52.91, a*=5.99, b*=7.14
"Thermal Coating": L*=53.19, a*=6.14, b*=7.07, (Delta) ΔE=0.32

TABLE 7

Composition of a Thermal Coating Tint Base plus Make-down Tint Base:

| Description | Weight % |
|---|---|
| Water | 27.85 |
| KTTP powder | 0.05 |
| Texanol | 2.50 |
| BYK-018 | 0.30 |
| Bermocol CST 349 | 0.30 |
| AMP-95 | 0.05 |
| Busperse 39 | 0.50 |
| CR-50-2 TiO$_2$ | 8.00 |
| NeoGen FTE | 10.00 |
| Omyacarb 10 | 9.00 |
| Busan 1024 | 0.05 |
| Polyphase 600 | 0.10 |
| IC-2950 | 10.00 |

TABLE 7-continued

Composition of a Thermal Coating Tint Base plus Make-down Tint Base:

| Description | Weight % |
|---|---|
| M-444S emulsion | 27.50 |
| K-20 Glass bubbles | 2.50 |
| 22-S Superwet | 0.15 |
| ASE-60 | 1.00 |
| PUR 2110 | 0.15 |
| Total: | 100.00 |
| Make-Down: (Green) | |
| Tint Base | 100 |
| IR Black | 0.60 |
| IR Brown | 7.32 |
| IR Green | 0.26 |
| IR Autumn Gold | 2.46 |
| IR Red | 0.2 |

TABLE 8

Composition of the Thermal Primer Tint Base:

| Description | Weight % |
|---|---|
| Water | 33.58 |
| KTTP powder | 0.04 |
| Texanol | 1.90 |
| BYK-018 | 0.19 |
| Bermocol CST 349 | 0.48 |
| AMP-95 | 0.38 |
| Busperse 39 | 0.30 |
| CR-50-2 TiO$_2$ | 3.81 |
| NeoGen FTE | 14.30 |
| Marblewhite 325 | 10.48 |
| Z-light spheres G-3150 | 4.76 |
| Busan 1024 | 0.04 |
| IC-2950 | 7.62 |
| M-444S emulsion | 20.95 |
| BYK-044 | 0.19 |
| 22-S Superwet | 0.19 |
| ASE-60 | 0.95 |
| PUR 2110 | 0.19 |
| Total | 100.00 |

Figure 7:
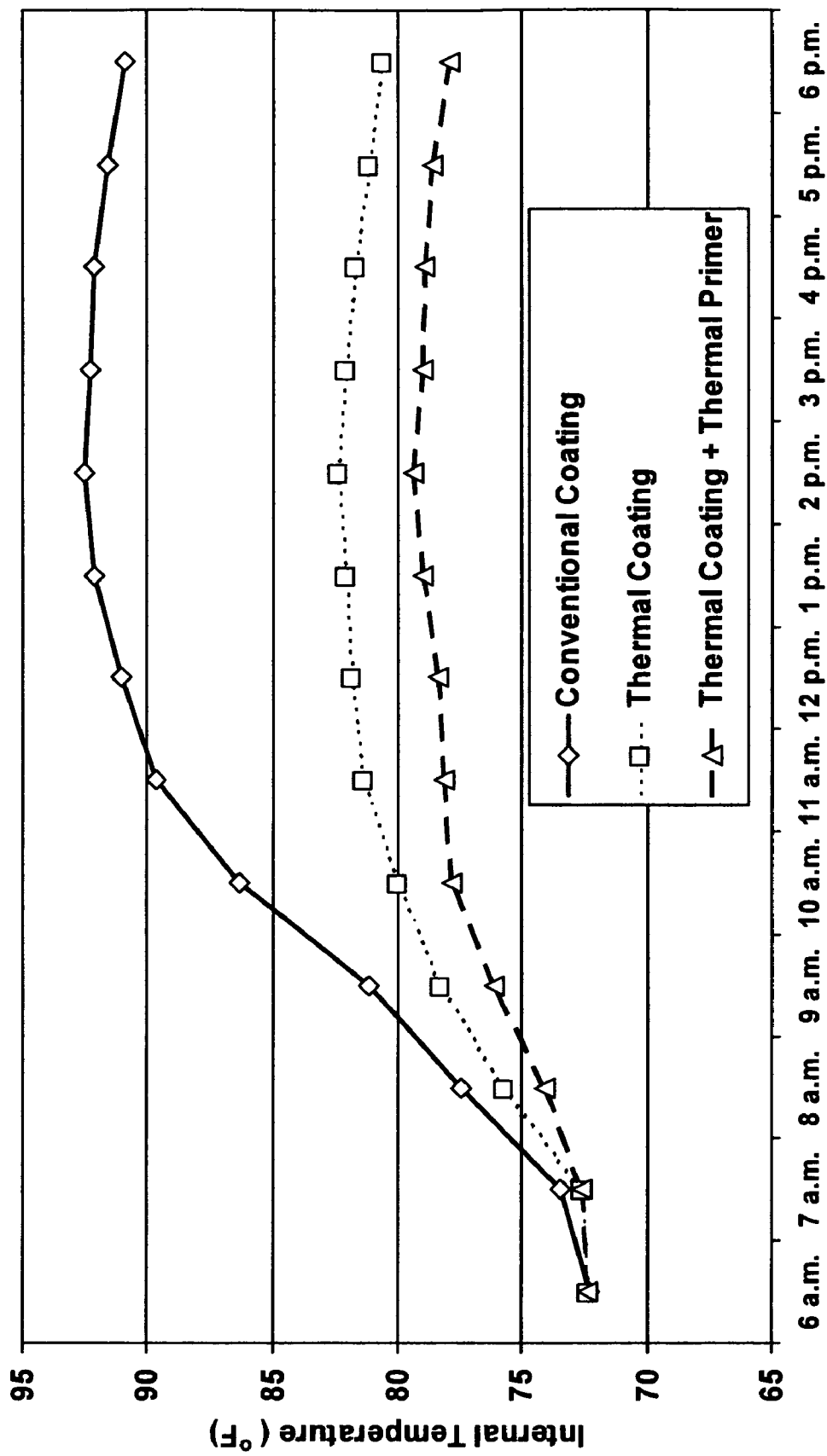
FIG. 7 shows the internal temperatures of the cubes depicted in Drawing 1, measured over a 12-hour period in Arizona.
Figure 8:
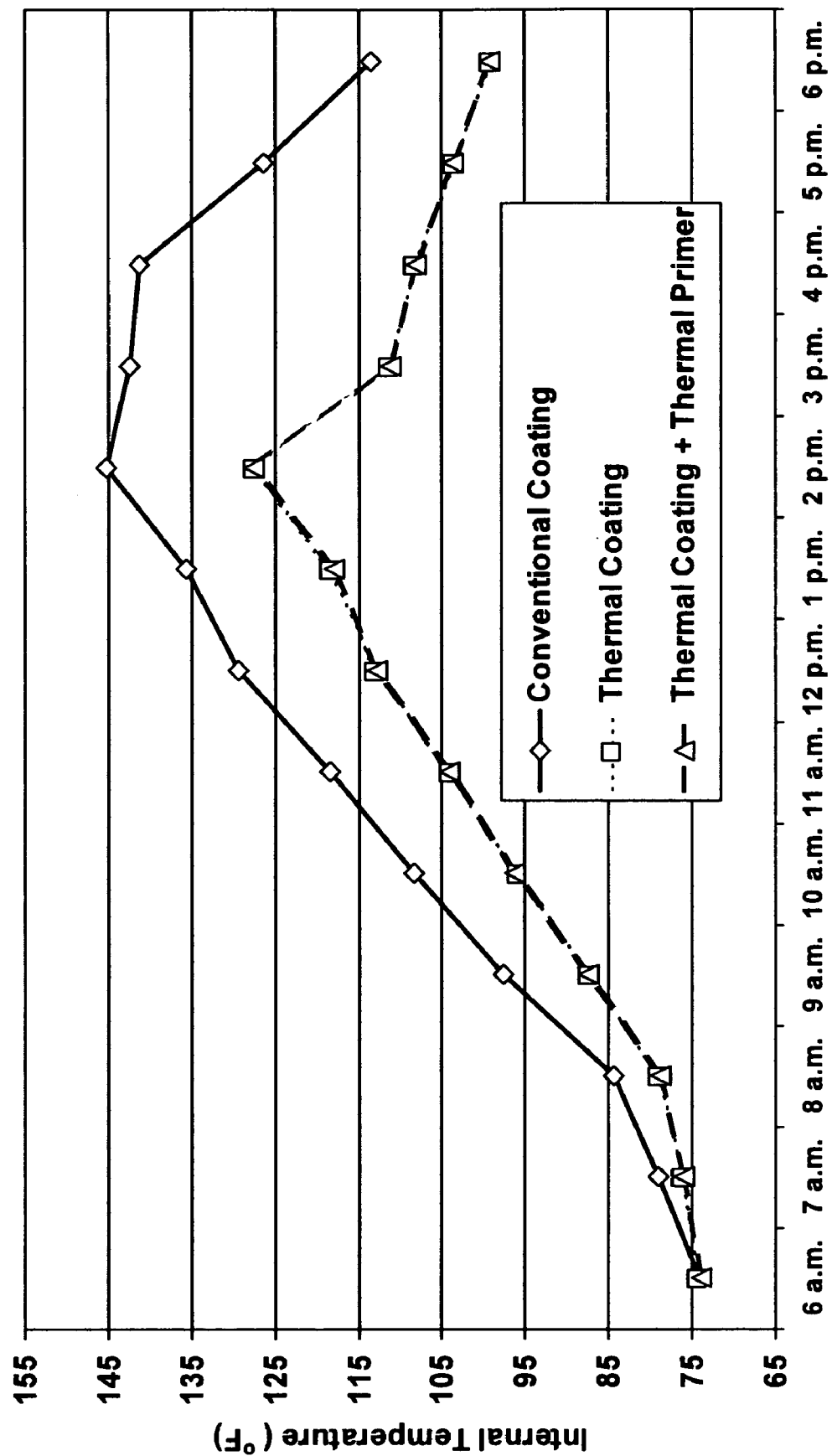
FIG. 8 shows the External temperatures of the cubes depicted in Drawing 1, measured over a 12-hour period in Arizona.

Once prepared, the cubes were positioned 6 feet apart, facing due South, in an open space in an undeveloped location in the desert near to Phoenix, Ariz. Temperature measurements were taken at 1-hour intervals beginning at 06:00 hours through 18:00 hours at both the center of the cubes (Table 9, FIG. 7) using the implanted thermocouples, and at the upper surface of the cube (Table 10, FIG. 8) using an infrared thermometer.

TABLE 9

INTERNAL temperature of cubes throughout a day in the Arizona Desert

| | INTERNAL Temperature (° F.) | | | Temperature Change | | |
|---|---|---|---|---|---|---|
| Time: | Cube I | Cube II | Cube III | Δ° F. I-II IR Coating Effect | Δ° F. I-III System Effect | Δ° F. II-III Primer Effect |
| 06:00 | 72.3 | 72.4 | 72.4 | −0.1 | −0.1 | 0 |
| 07:00 | 73.5 | 72.6 | 72.6 | 0.9 | 0.9 | 0 |
| 08:00 | 77.4 | 75.7 | 74.1 | 1.7 | 3.1 | 1.6 |
| 09:00 | 81.2 | 78.3 | 76.1 | 2.9 | 5.1 | 2.2 |
| 10:00 | 86.3 | 80.0 | 77.8 | 6.3 | 8.5 | 2.2 |

TABLE 9-continued

INTERNAL temperature of cubes throughout a day in the Arizona Desert

| Time: | INTERNAL Temperature (° F.) | | | Temperature Change | | |
|---|---|---|---|---|---|---|
| | Cube I | Cube II | Cube III | Δ° F. I-II IR Coating Effect | Δ° F. I-III System Effect | Δ° F. II-III Primer Effect |
| 11:00 | 89.6 | 81.4 | 78.1 | 8.2 | 11.5 | 3.3 |
| 12:00 | 91.0 | 81.9 | 78.4 | 9.1 | 12.6 | 3.5 |
| 13:00 | 92.1 | 82.1 | 79.0 | 10.0 | 13.1 | 3.1 |
| 14:00 | 92.5 | 82.4 | 79.4 | 10.1 | 12.9 | 2.8 |
| 15:00 | 92.3 | 82.1 | 79.0 | 10.2 | 13.3 | 3.1 |
| 16:00 | 92.1 | 81.7 | 78.9 | 10.4 | 13.2 | 2.8 |
| 17:00 | 91.6 | 81.2 | 78.6 | 10.4 | 13.0 | 2.6 |
| 18:00 | 90.9 | 80.6 | 77.9 | 10.3 | 13.0 | 2.7 |

TABLE 10

EXTERNAL temperature of cubes throughout a day in the Arizona Desert

| Time: | EXTERNAL Temperature (° F.) | | | Temperature Change | | |
|---|---|---|---|---|---|---|
| | Cube I | Cube II | Cube III | Δ° F. I-II IR Coating Effect | Δ° F. I-III System Effect | Δ° F. II-III Primer Effect |
| 06:00 | 74.2 | 74.3 | 73.9 | −0.1 | 0.3 | 0.4 |
| 07:00 | 78.9 | 76.2 | 76.0 | 2.7 | 2.9 | 0.2 |
| 08:00 | 84.3 | 78.9 | 78.7 | 5.4 | 5.6 | 0.2 |
| 09:00 | 97.6 | 87.5 | 87.4 | 10.1 | 10.2 | 0.1 |
| 10:00 | 108.4 | 96.1 | 96.2 | 12.3 | 12.2 | −0.1 |
| 11:00 | 118.3 | 104.2 | 104.2 | 14.1 | 14.1 | 0 |
| 12:00 | 129.4 | 113.1 | 112.8 | 16.3 | 16.6 | 0.3 |
| 13:00 | 135.6 | 118.4 | 118.0 | 17.2 | 17.6 | 0.4 |
| 14:00 | 145.3 | 127.5 | 127.4 | 17.8 | 17.9 | 0.1 |
| 15:00 | 142.4 | 111.3 | 111.1 | 31.1 | 31.3 | 0.2 |
| 16:00 | 141.2 | 108.3 | 108.1 | 33.9 | 33.1 | 0.2 |
| 17:00 | 126.4 | 103.7 | 103.8 | 22.7 | 22.6 | −0.1 |
| 18:00 | 113.6 | 99.3 | 99.2 | 14.3 | 14.4 | 0.1 |

Figure 9:
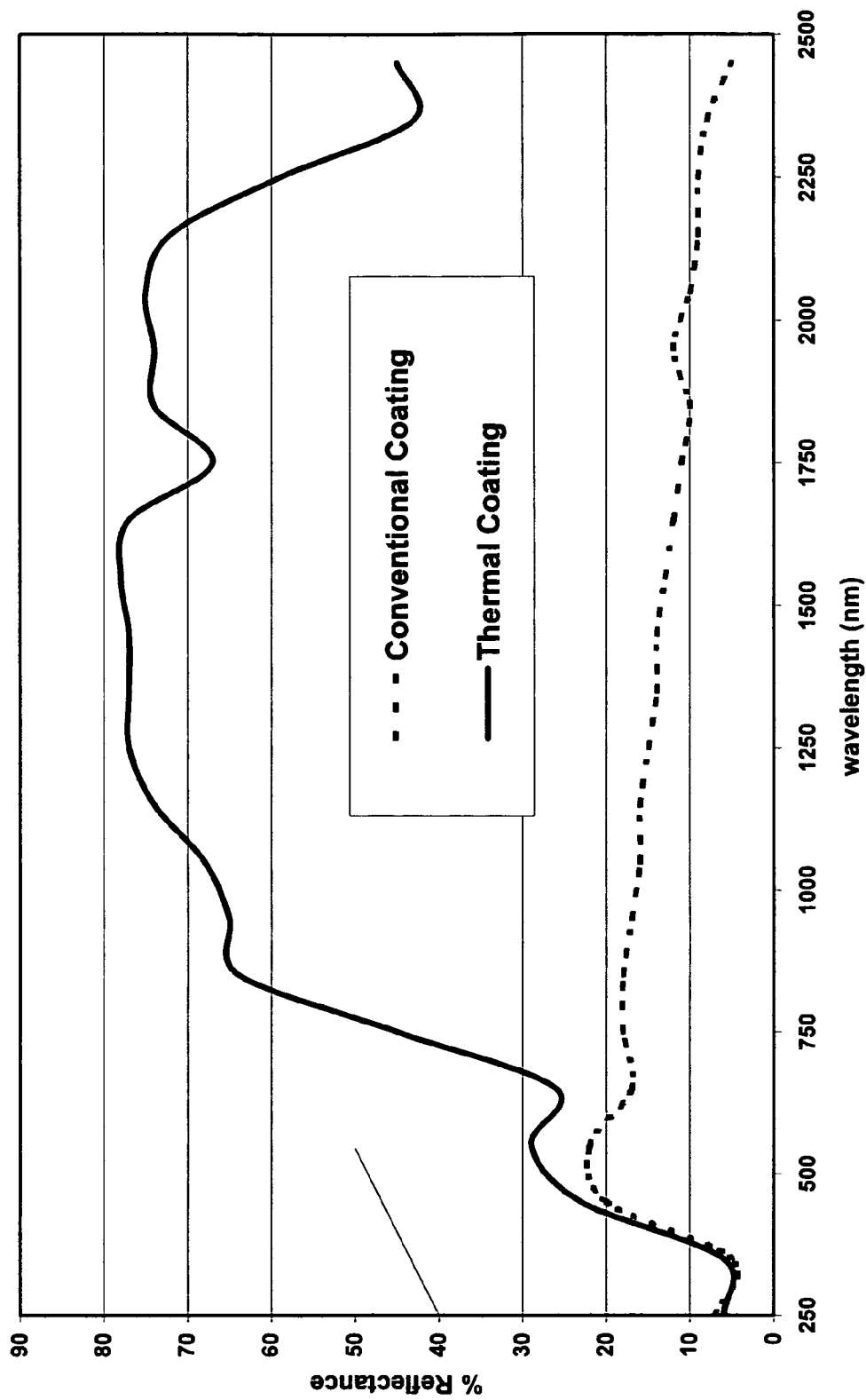
FIG. 9 shows the reflectance spectra for the cubes depicted in Drawing 1 for Conventional and Thermal Coating with equivalent CIE L*, a* and b* color space values.
Figure 10:
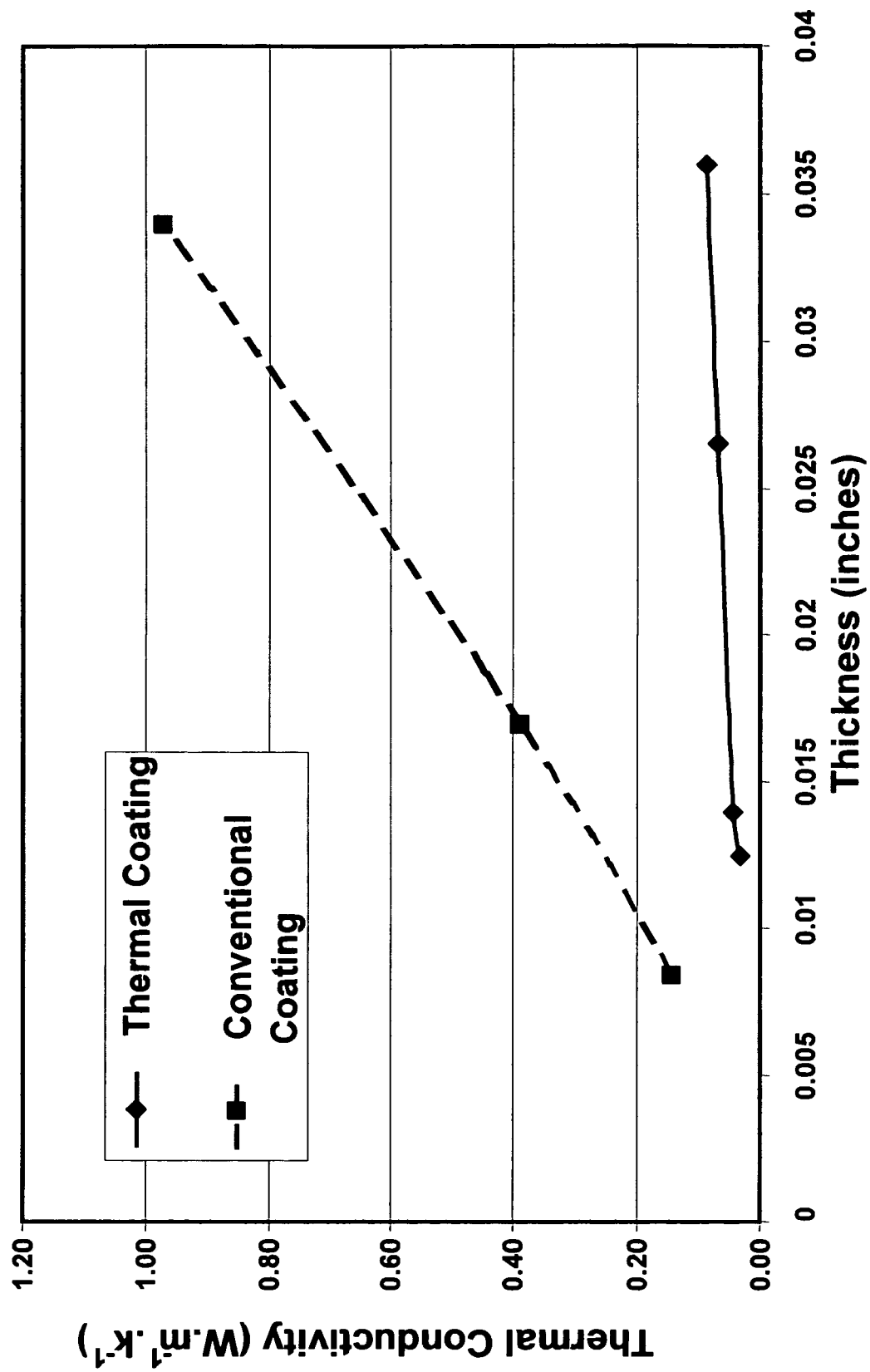
FIG. 10 Shows thermal conductivities of Conventional Coating and Thermal Coating applied to the test cubes depicted in Drawing 1.

The data clearly shows the effect of the Thermal Coating on both the external surface and internal temperatures of the cubes. The Thermal Primer assisted in reducing heat flow into the interior but had no impact on the external temperature of the cubes. Additionally, the Reflectance Spectra were measured for both the Standard Coating and the "Thermal Coating" at wavelengths from 250 nm to 2500 nm. The data is shown in graphical form in FIG. 9, which clearly shows the large difference in reflectivity in the infrared area. Additionally, Thermal conductivity measurements made on the Thermal Coating and the Conventional Coating (FIG. 10) reveal that these are over an order of magnitude in difference with the Thermal Coating being lower than the conventional material.

EXAMPLE 5

Figure 11:
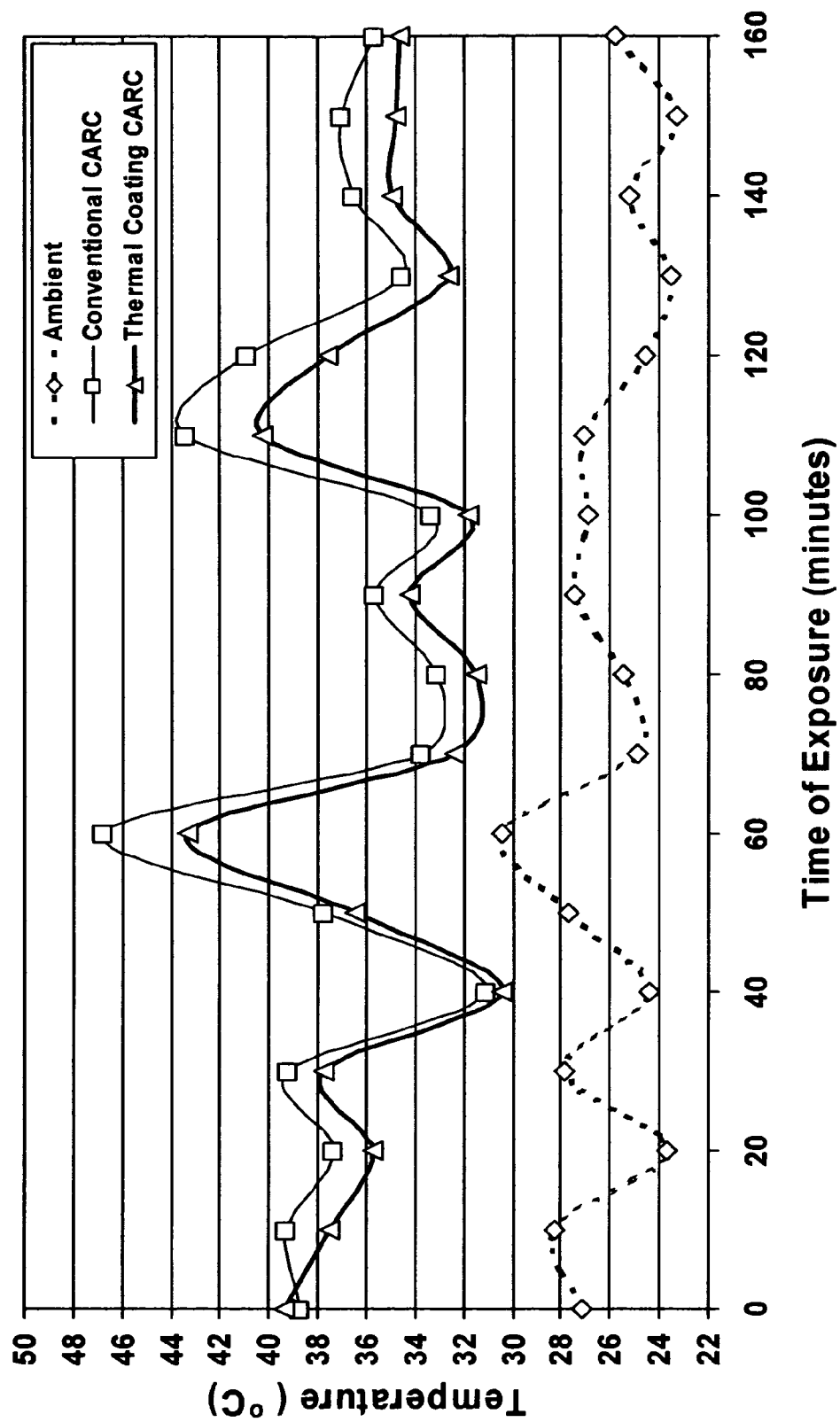
FIG. 11 shows the measured temperatures of equipment coated with black colored conventional infrared reflective CARC and Thermal Coating based CARC versus ambient temperature.

A Black, 2-part polyurethane, Thermal Coating was prepared to the formulation shown in Table 11. These formulations were designed to perform as a Chemical Agent Resistant Coating for use in a military armament application. They represent three different systems: formulation A, a conventionally Pigmented CARC, formulation B, a CARC Pigmented with an Infrared Reflective pigment system, and formulation C, An Infrared Reflective Pigment system augmented by incorporation of micro-spheres to reduce thermal conductivity. The Thermal Coating (formulation C) was applied to the outside of the case of a military Infra-Red targeting system and compared with a conventional IR reflective CARC (formulation B) coating in current use with respect to internal and external temperature plus targeting accuracy. The "conventionally pigmented material was not evaluated in this system as the conventional pigment does not meet the current military requirements for this form of CARC. The instrument housing was exposed to sunlight for a several hours. The temperature of the instrument surface was measured periodically. Temperature measurements are shown in Table 12 and FIG. 11.

Figure 12:
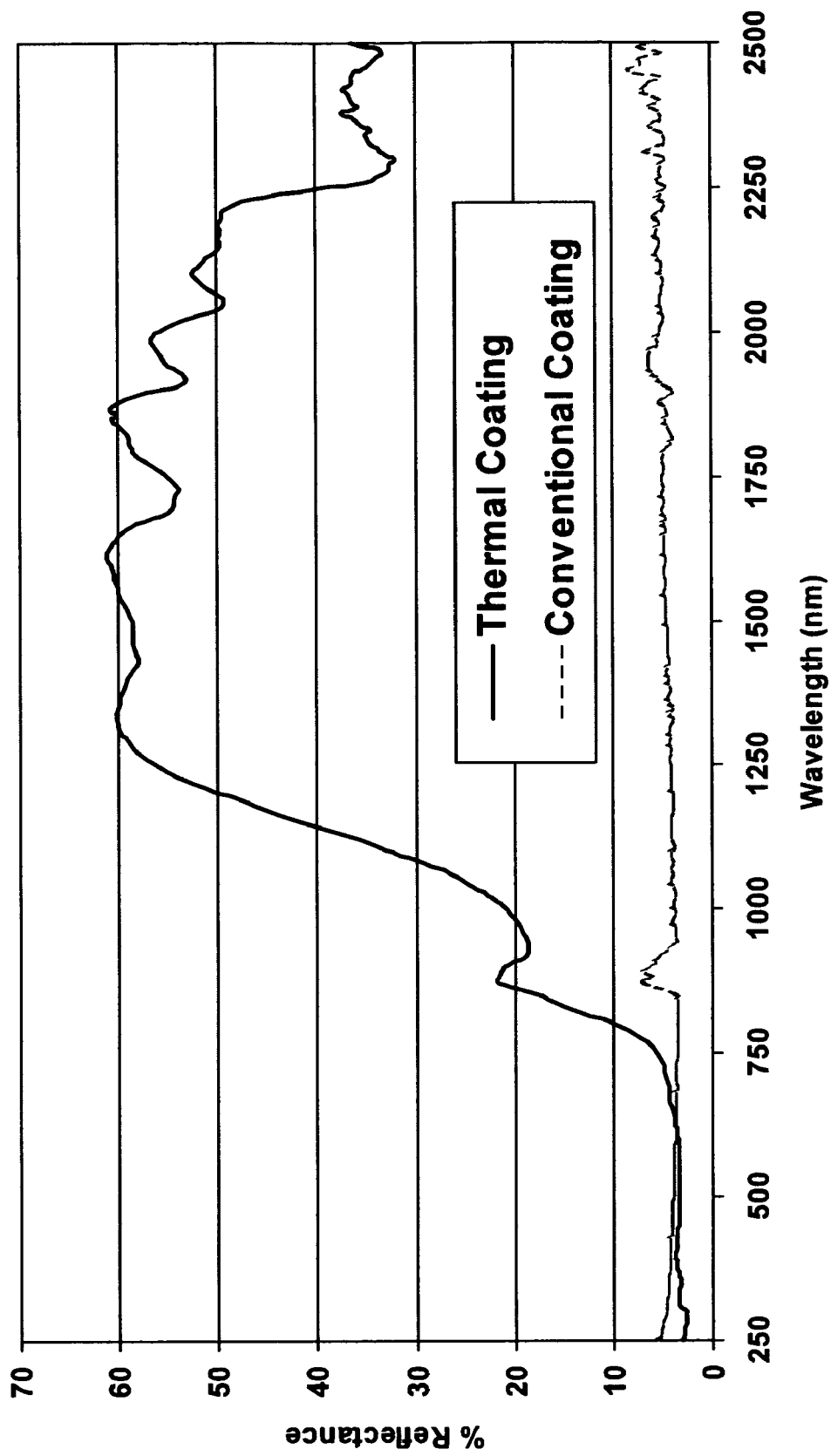
FIG. 12 showed the reflectance spectra for black conventional pigmented CARC and Thermal Coating based CARC.

Solar reflectance data is shown for the CARC's in FIG. 12, clearly showing the high infrared reflectivity of the "Thermal Coating" version (formulations B and C) compared to conventional black pigmentation (formulation A).

Figure 13:
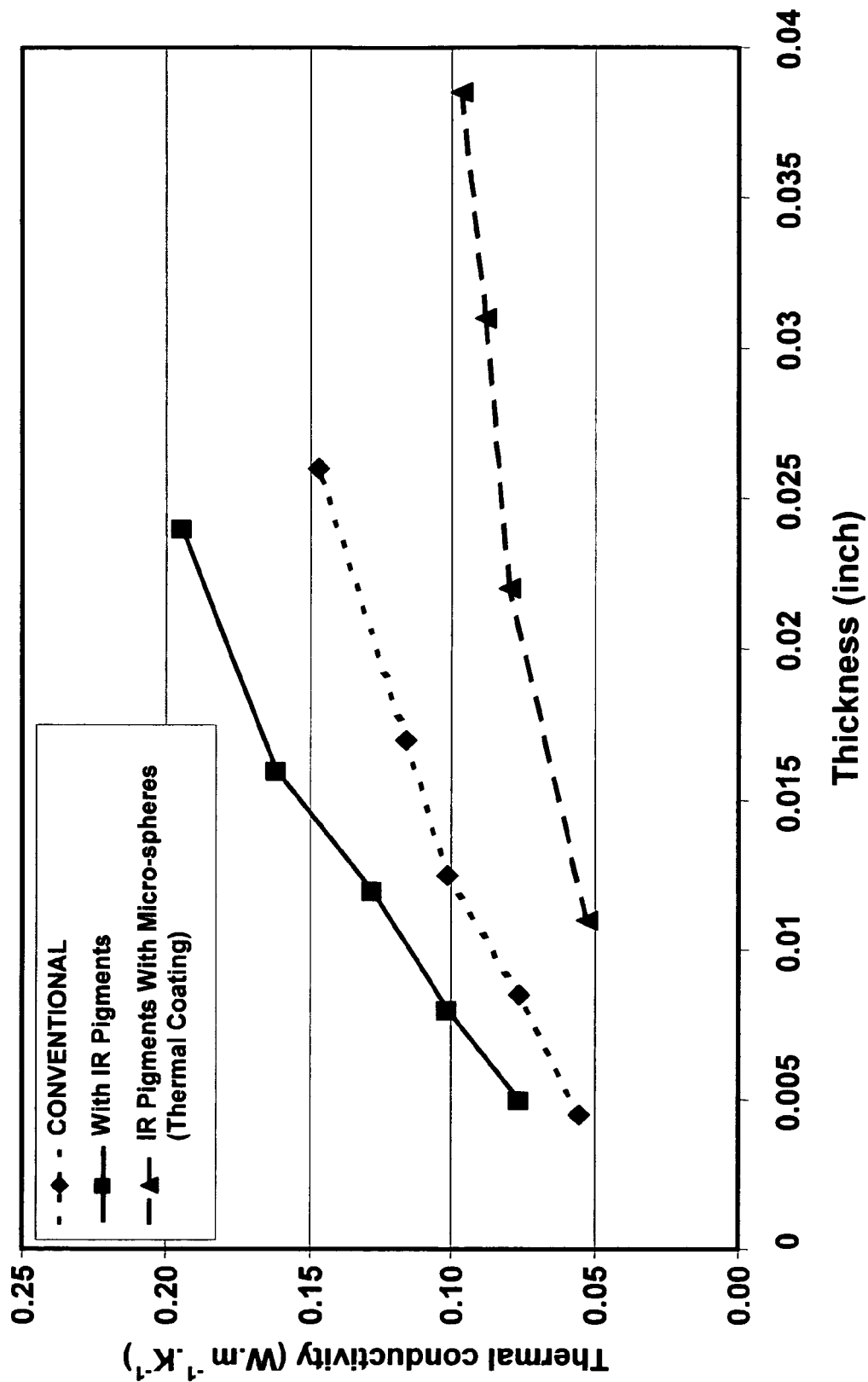
FIG. 13 shows the thermal conductivities of three different CARC formulations based on conventional pigment, infrared reflective pigment and Thermal Coating based CARC.

Thermal conductivities measured on the Black CARC's are shown in FIG. 13. It is very clear that replacement of a conventional black pigment (carbon black) by an infra-red reflective pigment does not increase the thermal conductivity properties of the paint film, in fact just the opposite was observed. On incorporation of micro-spheres into formulation B to create formulation C, the thermal conductivity is reduced significantly below either the conventional or infra-red reflective pigment based materials. Formulation C offers the benefits of both high infrared reflectance plus reduced thermal conductivity compared to the other systems.

TABLE 11

Black CARC Formulations

| | (1) Conventional | | (2) Infrared reflective | | (3) Full Thermal Coating | |
|---|---|---|---|---|---|---|
| | Weight | % | Weight | % | Weight | % |
| Part "A" | | | | | | |
| DB Glycol Ether | 25 | 11.77 | 25 | 11.77 | 25 | 9.53 |
| K-Flex 188 Polyester Polyol | 10.05 | 4.73 | 10.05 | 4.73 | 10.05 | 3.83 |
| Desmophen 631A-75 | 31.9 | 15.01 | 31.9 | 15.01 | 31.9 | 12.16 |
| MD101KC flatting agent | 30 | 14.12 | 30 | 14.12 | 30 | 11.43 |
| Pantane 2,4,dione | 3 | 1.41 | 3 | 1.41 | 3 | 1.14 |
| PM Acetate | 6 | 2.82 | 6 | 2.82 | 6 | 2.29 |
| Tinuvin 292 | 0.5 | 0.24 | 0.5 | 0.24 | 0.5 | 0.19 |
| Tinuvin 1130 | 0.25 | 0.12 | 0.25 | 0.12 | 0.25 | 0.10 |
| BYK-300 | 0.25 | 0.12 | 0.25 | 0.12 | 0.25 | 0.10 |
| CR-F20 | 0.30 | 0.14 | 0.30 | 0.14 | 0.30 | 0.11 |
| BYK-066N | 0.25 | 0.12 | 0.25 | 0.12 | 0.25 | 0.10 |
| Silane A1100 | 10 | 4.71 | 10 | 4.71 | 10 | 3.80 |

TABLE 11-continued

Black CARC Formulations

| | (1) Conventional | | (2) Infrared reflective | | (3) Full Thermal Coating | |
|---|---|---|---|---|---|---|
| | Weight | % | Weight | % | Weight | % |
| Carbon Black | 32.5 | 15.3 | — | — | — | — |
| IR Black V-799 | — | — | 32.5 | 15.30 | 32.5 | 12.38 |
| Zeolight Spheres G-3150 | — | — | — | — | 50 | 19.05 |
| Part B | | | | | | |
| Desmodure N-3200 | 62.42 | 29.39 | 62.42 | 29.39 | 62.42 | 23.79 |
| Totals: | 212.42 | 100.00 | 212.42 | 100.00 | 262.42 | 100.00 |

TABLE 12

Surface Temperature of Infrared Target System Housing in sunlight with Black CARC Formulations

| Time (Minutes) | (2) Conventional IR CARC (° C.) | (3) Thermal Coating CARC (° C.) | Ambient Temperature (° C.) |
|---|---|---|---|
| 0 | 38.73 | 39.35 | 27.13 |
| 10 | 40.88 | 38.69 | 28.31 |
| 20 | 37.39 | 35.79 | 23.70 |
| 30 | 39.22 | 37.79 | 27.89 |
| 40 | 31.09 | 30.45 | 24.40 |
| 50 | 37.73 | 36.48 | 27.72 |
| 60 | 46.79 | 43.29 | 30.42 |
| 70 | 33.76 | 32.34 | 24.87 |
| 80 | 33.11 | 31.50 | 25.45 |
| 90 | 35.70 | 34.20 | 27.50 |
| 100 | 33.31 | 31.85 | 26.92 |
| 110 | 43.44 | 40.28 | 27.05 |
| 120 | 40.90 | 37.63 | 24.61 |
| 130 | 34.56 | 32.60 | 23.49 |
| 140 | 36.58 | 34.99 | 25.24 |
| 150 | 37.08 | 34.78 | 23.29 |
| 160 | 35.65 | 34.62 | 25.77 |

The invention claimed is:

1. A paint coating system comprising:
a thermal paint coating incorporating therein first and second additives;
the first additive that provides a first property being thermal infra-red region reflectivity;
the second additive comprises hollow micro-spheres selected from hollow glass micro-spheres, hollow ceramic micro-spheres, and hollow organic polymer micro-spheres having a mean particle size of between 0.5 and 150 microns that provides a second property being a thermal conductivity below 0.3 $W \cdot m^{-1} \cdot K^{-1}$;
the first property of the first additive being thermal infra-red region reflectivity imparts in the thermal paint coating heat reflectivity;
the second property of the second additive being the thermal conductivity below 0.3 $W \cdot m^{-1} \cdot K^{-1}$ imparts in the thermal paint coating a resistance to thermal conductivity through the thermal paint coating; and
the heat reflectivity of the thermal paint coating cooperates with the resistance to thermal conductivity through the thermal paint coating to prevent heat transfer through the thermal paint coating.

2. A paint coating system according to claim 1, wherein the enhanced heat reflectivity further comprises an infra-red reflective index greater than approximately 1.0.

3. A paint coating system according to claim 2, wherein the first additive comprises a pigment material.

4. A paint coating system according to claim 3, wherein the pigment material further comprises an extender pigment material and an infra-red reflective pigment material.

5. A paint coating system according to claim 4, wherein the extender pigment material is selected from calcium carbonate, crystalline and amorphous silicas, silicate minerals, alumina trihydrate, aluminum oxides, barium sulfate, lithopone, zinc oxide, barium metaborate, antimony trioxide, magnesium hydroxide, aluminum trihydrate, ceramic powders, and fly ash.

6. A paint coating system according to claim 5, wherein the infra-red reflective pigment material is selected from calcined metal oxide compositions.

7. A paint coating system according to claim 1, wherein the second additive has the thermal conductivity value below approximately 0.3 $W \cdot m^{-1} \cdot K^{-1}$ at a thickness of the thermal paint coating of 0.003 inches.

8. A paint coating system, comprising:
a thermal paint coating applied to a thermal primer paint coating forming a paint coating system;
the thermal paint coating incorporates therein a first additive that provides a first property being thermal infra-red region reflectivity;
the thermal primer paint coating incorporates therein a second additive comprising hollow micro-spheres selected from hollow glass micro-spheres, hollow ceramic micro-spheres, and hollow organic polymer micro-spheres having a mean particle size of between 0.5 and 150 microns that provides a second property being a thermal conductivity below 0.3 $W \cdot m^{-1} \cdot K^{-1}$;
the first property of the first additive being thermal infra-red region reflectivity imparts in the thermal paint coating heat reflectivity;
the second property of the second additive being thermal conductivity below 0.3 $W \cdot m^{-1} \cdot K^{-1}$ imparts in the thermal primer paint coating a resistance to thermal conductivity through the thermal primer paint coating; and
the heat reflectivity of the thermal paint coating cooperates with the resistance to thermal conductivity through the thermal primer paint coating to prevent heat transfer through the paint coating system from the thermal paint coating to the thermal primer paint coating.

9. A paint coating system according to claim 8, wherein the enhanced heat reflectivity further comprises an infra-red reflective index greater than approximately 1.0.

10. A paint coating system according to claim 9, wherein the first additive comprises a pigment material.

11. A paint coating system according to claim 10, wherein the pigment material further comprises an extender pigment material and an infra-red reflective pigment material.

12. A paint coating system according to claim 11, wherein the extender pigment material is selected from calcium carbonate, crystalline and amorphous silicas, silicate minerals, alumina trihydrate, aluminum oxides, barium sulphate, lithopone, zinc oxide, barium metaborate, antimony trioxide, magnesium hydroxide, aluminum trihydrate, ceramic powders, and fly ash.

13. A paint coating system according to claim 12, wherein the infra-red reflective pigment material is selected from calcined metal oxide compositions.

14. A paint coating system according to claim 8, wherein the second additive has the thermal conductivity value below approximately $0.3 \text{ W} \cdot \text{m}^{-1} \cdot \text{K}^{-1}$.

* * * * *